US009166796B2

(12) United States Patent
Albahdal et al.

(10) Patent No.: US 9,166,796 B2
(45) Date of Patent: Oct. 20, 2015

(54) SECURE BIOMETRIC CLOUD STORAGE SYSTEM

(71) Applicants: Abdullah A Albahdal, Colorado Springs, CO (US); Terrance E Boult, Colorado Springs, CO (US)

(72) Inventors: Abdullah A Albahdal, Colorado Springs, CO (US); Terrance E Boult, Colorado Springs, CO (US)

(73) Assignee: Prince Sattam Bin Abdulaziz University, Alkharj (SA)

( * ) Notice: Subject to any disclaimer, the term of this patent is extended or adjusted under 35 U.S.C. 154(b) by 0 days.

(21) Appl. No.: 14/312,395

(22) Filed: Jun. 23, 2014

(65) Prior Publication Data

US 2014/0380040 A1 Dec. 25, 2014

Related U.S. Application Data

(60) Provisional application No. 61/838,674, filed on Jun. 24, 2013.

(51) Int. Cl.
| | |
|---|---|
| *H04L 9/32* | (2006.01) |
| *H04L 29/06* | (2006.01) |
| *G06F 21/32* | (2013.01) |
| *H04L 9/08* | (2006.01) |

(52) U.S. Cl.
CPC .............. *H04L 9/3247* (2013.01); *G06F 21/32* (2013.01); *H04L 9/088* (2013.01); *H04L 9/0894* (2013.01); *H04L 63/0861* (2013.01); *G06F 2221/2107* (2013.01); *H04L 9/3231* (2013.01)

(58) Field of Classification Search
CPC ... H04L 9/3247; H04L 63/0861; H04L 9/088; H04L 9/0894; H04L 9/3231; G06F 21/32; G06F 2221/2107

USPC .......................... 713/155, 165, 166, 185, 186
See application file for complete search history.

(56) References Cited

U.S. PATENT DOCUMENTS

| | | | | |
|---|---|---|---|---|
| 6,490,680 | B1 * | 12/2002 | Scheidt et al. | 713/166 |
| 6,889,210 | B1 * | 5/2005 | Vainstein | 705/57 |
| 7,260,555 | B2 * | 8/2007 | Rossmann et al. | 705/51 |
| 8,341,405 | B2 | 12/2012 | Meijer et al. | |
| 8,589,372 | B2 | 11/2013 | Krislov | |

(Continued)

OTHER PUBLICATIONS

Govinda, et al., "Secure Data Storage in Cloud Environment Using Biometrics", May 2012. vol. 2, Issue 5, p. 11-16. International Journal of Advanced Research in Computer Science and Software Engineering, www.ijarcsse.com: ISSN: 2277 128X.

Joshi, et al., "Three Tier Data Storage Securityin Cloud Using Face Fuzzy Vault", 2012. International Journal of Internet Computing ISSN No. 2231-6965, vol. 1, ISS-3.

(Continued)

*Primary Examiner* — Jung Kim
*Assistant Examiner* — Thomas Ho
(74) *Attorney, Agent, or Firm* — Oblon, McClelland, Maier & Neustadt, L.L.P.

(57) ABSTRACT

A secure and scalable data storage system that includes a server and a plurality of clients. The server maintains an access permission file that includes a file-group name, a plurality of client access blocks, a first and second public key, and a signature that is based on a first private key. The signature ensures that only clients who have a certain level of access can modify the contents of the access blocks. Each client access block includes at least one of a first access key, a second access key and a third access key. The access keys are encapsulated within biometric information of the client. The server grants one of a first level of access based on a successful verification of a signed request with the first public key and a second level of access based on a successful verification of the signed request with the second public key.

20 Claims, 18 Drawing Sheets

(56) References Cited

U.S. PATENT DOCUMENTS

2005/0240779 A1* 10/2005 Aull et al. .................. 713/186
2009/0271634 A1* 10/2009 Boult et al. ................. 713/186
2013/0047268 A1    2/2013 Arat

OTHER PUBLICATIONS

Govinda, et al., "T Secure Data Storage in Cloud Environment Using Fingerprint", 2012, Asian Journal of Computer Science and Information Technology 2:5, p. 99-103; ISSN 2249-5126.

* cited by examiner

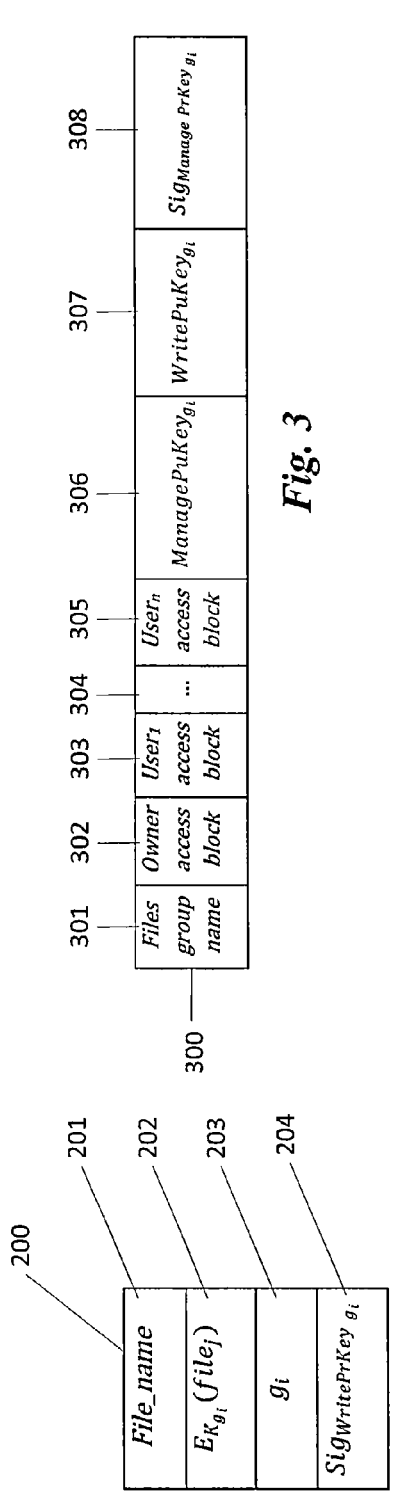
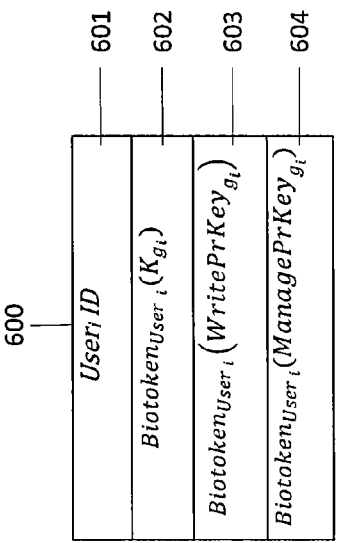

SECURE BIOMETRIC CLOUD STORAGE SYSTEM

CROSS-REFERENCE TO RELATED APPLICATIONS

This application is based upon and claims the benefit of priority under 35 U.S.C. §119(e) from the prior Provisional U.S. Patent Application Ser. No. 61/838,674, filed on Jun. 24, 2013, the entire contents of which are herein incorporated by reference.

GRANT OF NON-EXCLUSIVE RIGHT

This application was prepared with financial support from the Saudia Arabian Cultural Mission, and in consideration therefore the present inventor(s) has granted The Kingdom of Saudi Arabia a non-exclusive right to practice the present invention.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Current security-enhancing mechanisms for cloud based storage systems cannot be relied upon to store and share data of a highly confidential nature. For instance, data pertaining to patient records in hospitals and healthcare organizations, financial data pertaining to stock investments and trade markets, sensitive information pertaining to government organizations or the like, require a reliable and trustworthy approach of securing and maintaining data confidentiality. The lack of trust in current security systems is primarily due to their strong reliance on passwords for authenticating users of the system. A confidentiality service that relies only on passwords to authenticate its users runs the risk of being compromised as unauthorized user(s) may infiltrate such systems by using mechanisms such as hacking and stealing to gain access to the passwords of legitimate users.

SUMMARY

The present disclosure describes a security enhancing mechanism for a cloud based data storage system that uses biometric and cryptographic techniques to provide secure data access. Specifically, by using biometric techniques to access data from the cloud (data retrieval and storage system), the security and usability of the system is enhanced in that, the users of the system are not required to memorize long complicated passwords that may be used to encrypt the data, or remember the keys that are used for encryption.

The present disclosure describes a data retrieval and storage system wherein client profiles are maintained in an access permission file. The access permission file assigns each client profile at least one access key. The access key(s) assigned for each client are encapsulated within biometric information of the client. Thus, when a client chooses to perform certain operations such as modifying, deleting, updating, downloading a file or the like, access to the data system can be obtained by using only biometric information of the client. Thus, clients of the data storage system do not have to rely on passwords (and possibly their misuse) when accessing the data storage system. Furthermore, the data storage system is robust as the system does not transmit biometric information or access (encryption) keys over the network. The access keys are encapsulated within a bio-token and accessed by the clients at a client terminal with the help of a biometric reader. Thus, the security of the system is enhanced as the system is not prone to attacks of unauthorized clients that try to gain access to the access keys.

Accordingly, an aspect of the present disclosure provides a data storage system that includes: a network, at least one client, and at least one server. The server is configured to maintain at least one access permission file having a file-group name, a plurality of client access blocks, a first public key, a second public key and a signature, each client access block including a client ID and at least one of a first access key, a second access key and a third access key; generate and store for each access key, a bio-token that encapsulates the access key with a biometric information of the client; determine if a request received from the client is signed using one of the first access key and the second access key; transmit to the client via the network, the client access block based on the client ID, upon determining that the received request is not signed. The server further grants one of a first level of access to the client based on a successful verification of the signed request with the first public key and a second level of access to the client based on a successful verification of the signed request with the second public key.

According to another embodiment of the present disclosure is provided a method. The method including: maintaining on at least one access permission file having a file-group name, a plurality of client access blocks, a first public key, a second public key and a signature, each client access block including a client ID and at least one of a first access key, a second access key and a third access key. The method further includes generating and storing, at the atleast one server, for each access key a bio-token that encapsulates the access key with a biometric information of the client; determining if a request received from the client is signed using one of the first access key and the second access key; transmitting to the client via the network, the client access block based on the client ID, upon determining that the received request is not signed, and granting, by the atleast one server, one of a first level of access to the client based on a successful verification of the signed request with the first public key and a second level of access to the client based on a successful verification of the signed request with the second public key.

According to another embodiment of the disclosure is provided a computing device that includes at least one server. The server is configured to maintain at least one access permission file having a file-group name, a plurality of client access blocks, a first public key, a second public key and a signature, each client access block including a client ID and at least one of a first access key, a second access key and a third access key, generate and store for each access key, a bio-token that encapsulates the access key with a biometric information of the client, determine if a request received from the client is signed using one of the first access key and the second access key; transmit to the client via the network, the client access block based on the client ID, upon determining that the received request is not signed, and grant one of a first level of access to the client based on a successful verification of the signed request with the first public key and a second level of access to the client based on a successful verification of the signed request with the second public key.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

Various embodiments of this disclosure that are proposed as examples will be described in detail with reference to the following figures, wherein like numerals reference like elements, and wherein:

FIG. 2 illustrates a Bio-cloud file format according to one example;

FIG. 3 illustrates a format for a file-group according to one example;

FIG. 4 illustrates a read-access block according to one example;

FIG. 5 illustrates a write-access block according to one example;

FIG. 6 illustrates a manage-access block according to one example;

DETAILED DESCRIPTION OF EMBODIMENTS

Figure 1:
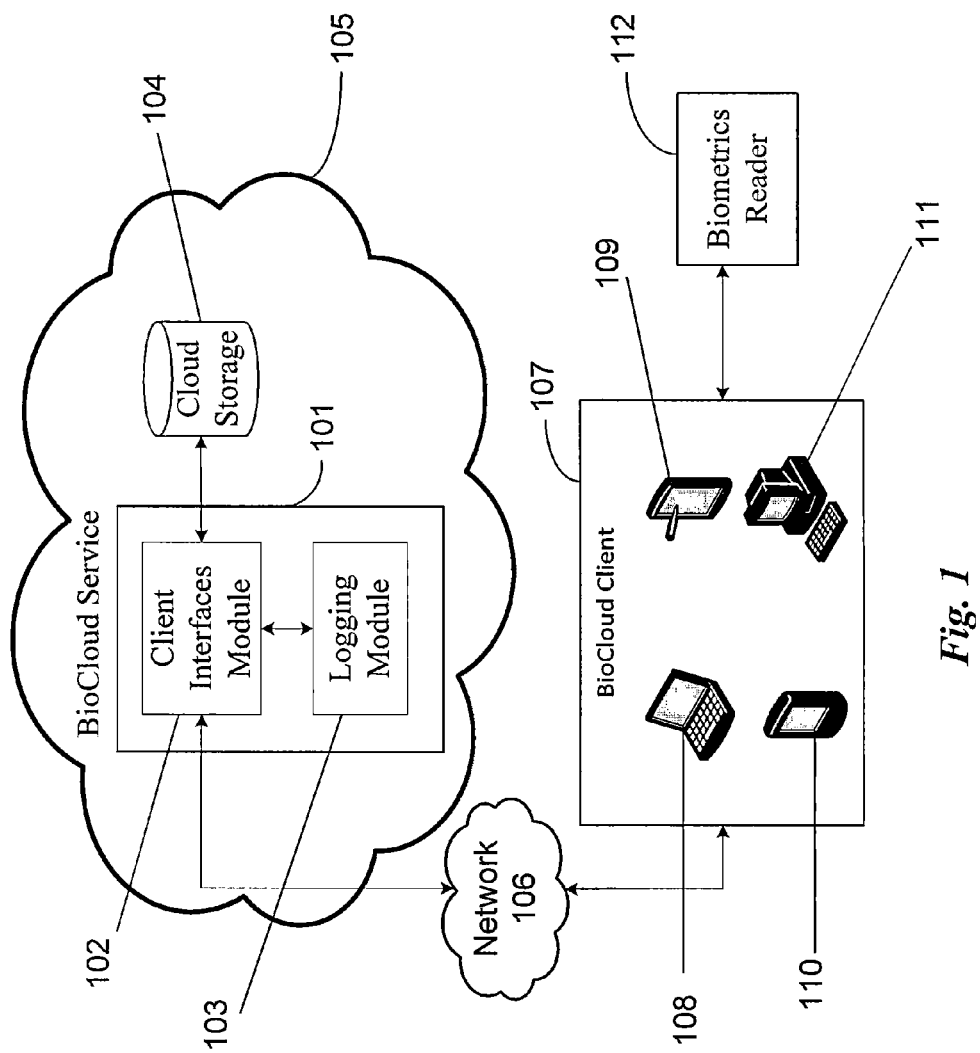
FIG. 1 illustrates a Bio-cloud system according to one embodiment.

The present disclosure describes a security enhancing mechanism for data stored in a cloud. According to an embodiment, secure access to data files stored in the cloud is provided by using a bio-cryptographic technique. Specifically, secure access is provided by using a security enhancing mechanism that uses both, biometric and cryptographic (referred to herein as bio-cryptographic) techniques. Accordingly, in the present embodiment, the cloud system that stores the data files and grants access to different users based on a level of access, is referred to as a Bio-cloud.

In contrast to traditional security-enhancing mechanisms that rely solely on cryptographic primitives to provide data confidentiality and integrity, Bio-cloud relies on biocryptography in order to provide confidentiality and integrity for user's files stored in the cloud. Such a bio-cryptographic technique enhances the authenticity of users, and thereby enhances the confidentiality of data that is lacking when cloud storage systems rely solely on traditional cryptographic primitives.

Traditional cryptographic primitives such as symmetric and asymmetric encryption suffer from lack of authenticity since they rely only on a password-based authentication mechanism for authenticating users of different keys. For example, passwords are used as a symmetric encryption key to encrypt users' private keys. However, the use of such passwords is susceptible to access by unauthorized users. For instance, passwords may be stolen, guessed, or even obtained my means such as hacking or the like. Thus, relying solely on a password based approach to provide secure access reduces the level of authenticity of the users. Moreover, relying on passwords for encrypting keys has a further limitation of scalability and usability. Specifically, the users are required to use long, complicated, and unique passwords (i.e. secure passwords) that make them difficult to remember. For instance, data storage systems typically impose several criteria that need to be followed when a user selects a password to be authenticated by the system. For example, password may be required to be at least of a certain length (number of characters), the password may be required to include a certain combination of numbers, special characters or the like. Such restrictions tend to be exasperating to the user as they require the user to remember the long complicated password.

Bio-cloud leverages bio-cryptography in order to overcome the security and usability limitations of security-enhancing mechanisms for cloud storage systems. According to an embodiment, the security of cloud storage is improved by enhancing the authentication of users of different cryptographic keys that are used for signing, encrypting, decrypting purposes or the like. Specifically, to obtain access to any signing, encryption/decryption or the like keys requires the user to submit his/her fingerprint (biometric information) in order to release the keys that are stored in the Bio-cloud. Thus, the user is not required to specifically remember or maintain a copy of the key in a safe place. Thus, the Bio-cloud enhances the usability of cloud storage systems by not requiring users to remember any long or complicated passwords to be used for encrypting keys. Rather, the Bio-cloud requires user's biometric information such as fingerprint, face-recognition, speech recognition, or the like information for providing secure access to user's keys.

According to another embodiment, in order to enhance the authenticity of users of cryptographic keys, Bio-cloud uses bio-tokens that define different methods that enable encrypting data (i.e. keys) and provide for decrypting the data only upon successful biometric matching of the legitimate user's biometric information. Thus, upon a successful biometric match of a particular user, the specific key is released to the user from the bio-token.

Bio-tokens are key-binding bio-cryptographic techniques that permit embedding data (i.e. keys) into a user's biometric data. The specific embedded key in the bio-token is released only upon successful biometric matching. According to an embodiment of the present disclosure, key binding bio-cryptographic techniques such as bipartite tokens as described by W. Scheirer and T. Boult, "Bipartite Biotokens: definition, implementation, and analysis", Advances in Biometrics, pp 775-785, 2009, and incorporated by reference herein, or a fuzzy commitment scheme as described by A. Juels and M. Wattenberg, "A fuzzy commitment scheme", in proceedings of 6$^{th}$ ACM conference on computers and communication security, 1999 and incorporated by reference herein, may be used.

Furthermore, the Bio-cloud system of the present disclosure may alternately use Bio-tokens that are generated by using a user's biometric certificate (bio-certificates) as described by W. Scheirer, B. Bishop, and T. Boult, "Beyond PKI: the bio-cryptography key infrastructure", in 2010 IEEE Workshop on information forensics and security, incorporated by reference herein. In addition, the bio-tokens can also be generated by using biosensors as described in U.S. Pat. No. 8,145,916, which is incorporated by reference herein.

FIG. 1 illustrates a Bio-cloud system according to one example. The Bio-cloud system may include a Bio-cloud client 107, Bio-cloud service (i.e., a Bio-cloud server) 101 and a cloud storage 104. The Bio-cloud client 107 may be executed in software/hardware on a user's device such as a desktop 111, a laptop 108, a tablet 109, a smartphone 110 or the like devices. The Bio-cloud client 107 may be connected to the Bio-cloud server 101 via a network 106. The network 106 may be a local area network, a dedicated network, or even the Internet. The Bio-cloud server 101 provides its clients with an interface, wherein the user's operational commands may be received at an interface module 102. The interface module 102 receives user's commands, processes the commands, retrieves/writes files into an access permission file (to be described) from/to the cloud storage 104. The interface module 102 provides a medium to serve the processed results back to Bio-cloud client 107. Additionally, the Bio-cloud server 101 may include a logging module 103, which optionally logs user's commands for verification purposes.

The Bio-cloud server 101 provides the client 107 with several functions to access and manage user's files and file-groups (to be described with reference to FIG. 3). Operations pertaining to files may include downloading, updating, deleting, and uploading new files. On the other hand, file-group functions may include updating, deleting, and creating new file-groups. To enhance the non-repudiation of user's access to the files or a file-group (also referred to herein as an access permissions file), Bio-cloud may optionally maintain user's commands that are signed by the appropriate access keys in the logging module 103. For instance, for an update file command that is signed with the relevant write-access private key, the Bio-cloud server 101 logs the command as a proof that a legitimate user (i.e. a user who has access to the write-access private key) has modified the file. Alternatively, according to one embodiment, the Bio-cloud system may incorporate a plurality of servers to provide the bio-cloud clients access to the cloud storage.

In what follows, a description of how Bio-tokens are used by the Bio-cloud to provide secure and flexible data access and file sharing mechanisms is provided. Table I depicts the various symbols/keys (and their corresponding description) that are used in the Bio-cloud system.

TABLE I

Keys used in Bio-cloud

| Symbol or key | Description |
|---|---|
| $g_i$ | A file-group i. Files are organized as file-groups |
| $K_{gi}$ | A symmetric read-access key for the file-group i |
| WritePrKey$_{gi}$ | A write-access private key for the file-group i |
| WritePuKey$_{gi}$ | A write-access public key for the file-group i |
| ManagePrKey$_{gi}$ | A manage-access private key for the file-group i |
| ManagePuKey$_{gi}$ | A manage-access public key for the file-group i |
| Sig$_{WritePrKeygi}$ | A signature using the write-access private key |
| Sig$_{ManagePrKeygi}$ | A signature using the manage-access private key |
| Biotoken$_A$ (K)$_{gi}$ | A bio-token for user A that embeds the read-access key |
| Biotoken$_A$ (WritePrKey$_{gi}$) | A bio-token for user A that embeds the write-access private key |
| Biotoken$_A$ (ManagePrKey$_{gi}$) | A bio-token for user A that embeds the manage-access private key |

FIG. 2 illustrates a Bio-cloud file format 200 according to one example. The format of the file includes a filename 201, a symmetric read-access key ($K_{g_i}$) assigned to a particular file-group i. The symmetric read access key is used to encrypt each file (represented as $EK_{g_i}$ (file j) in the present example) 202, a file-group ($g_i$) represented as 203 that indicates the group to which the particular file belongs and a signature 204 that uses the write access private key assigned to the group, and is used to modify the contents of the file by a legitimate user.

FIG. 3 illustrates a format for a file-group 300 according to one example. The term file-group is also referred to as an access permission file in the present embodiment. Each access permission file has atleast a read access key, a write access key and a manage access key that permit users to read, write (modify) and manage access to the member files that belong to the file-group. These keys are secured using the owner's (the creator of the access permission file) bio-token and other users' bio-token according to the access permission granted for the users. The access permission file includes a file-group name 301 and an owner's access block 302. The owner's access block 302 includes 3 keys (a write private key, a manage private key and a symmetric read-access key) that are described with reference to FIG. 6. For each user who is a member of the file-group, a user access block 303-305 is maintained in the access permission file. Each access block can be one of a read-access block (to be described with reference to FIG. 4), a write-access block (to be described with reference to FIG. 5), or a manage access block (to be described with reference to FIG. 6). Each access block contains a user ID and one or more bio-tokens that secure the appropriate access key. To sanction a user's file, each file-group 300 also includes a write-access public key 307 that is used to verify the authenticity and correctness of files 200 that belong to the group using the signature that is attached to each file 204.

Further, each access permission file 300 also contains a manage access public key 306 that is used to verify the authenticity and correctness of the access permission file 300 using the signature attached to each access permission file 308. Note that the signature 308 is a signature that is used for signing the entire file-group 300. A user having manage-access permission can modify the access permission file 300, and sign the access permission file 300 using the manage-access private key. Note that the manage access private key can be obtained from the bio-token that embeds the private manage-access key, as shown in 604 in FIG. 6.

FIG. 4 illustrates according to an embodiment a read-access block of the Bio-cloud system. The read-access block 400 includes a user ID 401 and a bio-token 402. The access key associated with the bio-token for a particular user is the symmetric read-access key for the particular file-group. Upon successful verification of a user's biometric information, the symmetric read-access key that is embedded within the Bio-token, can be obtained thereby enabling the user to view the content of the particular file.

FIG. 5 illustrates a write-access block according to one example of the present disclosure. The write-access block 500 includes a user ID 501 and bio-tokens 502 and 503. The Bio-token 502 is similar to the Bio-token 402 (FIG. 4) and utilizes the symmetric read-access key that is encapsulated within the biometric information of the user. The Bio-token 502 is used to gain read access to a particular file belonging to the file-group. The Bio-token 503 utilizes a write-access private key that enables a user to modify the content of a particular file that belongs to the file-group. Thus, upon successful verification of the biometric information submitted by a user, a corresponding key can be used by the user to either read or write (modify) a particular file belonging to the file-group.

FIG. 6 illustrates a manage access block according to an example of the present disclosure. The manage access block 600 includes a user ID 601 and Bio-tokens 602, 603 and 604. The bio-token 602 corresponds to the bio-tokens 402 and 502. Specifically, the Bio-token 602 utilizes a symmetric read-access key encapsulated within a user's biometric information. The symmetric read-access key permits a user only to view the content of a particular file. Bio-token 603 utilizes a write-access private key encapsulated within the biometric information of the user. The write-access private key enables a user to modify the content of a particular file belonging to the file-group. The Bio-token 604 utilizes a manage access private key to encapsulate the biometric information of a user. Note that the manage access private key is generated by the owner of the file-group. This key can be used by the owner to allocate managerial access to other users that belong to the file-group. Specifically, an owner of the access permission file (or alternatively a user who has managerial access) can upgrade another user's bio-token such that the user has management access to the access permission file 300.

Note that in the descriptions of FIGS. 4, 5 and 6 the symmetric read-access key, the write-access key, the manage access key, are unique for a particular file-group such as 300. Further, the owner's access block 302 as depicted in FIG. 3 would correspond to a manage access block as shown in FIG. 6. Moreover, the user's access block 303-305 can correspond to either a read-access block, a write-access block or a manage access block as depicted in FIGS. 4-6.

Figure 7:
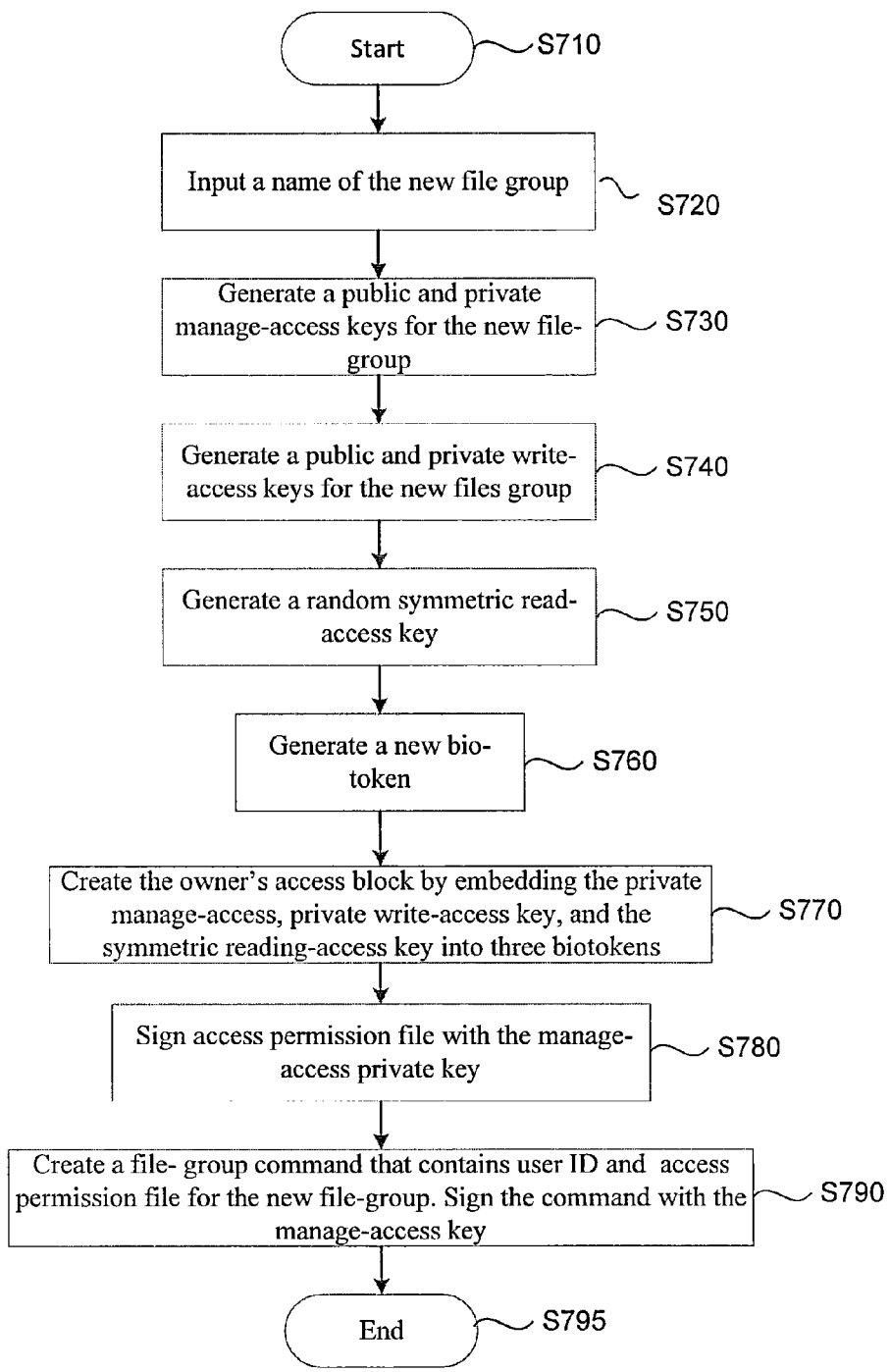
FIG. 7 illustrates a flowchart for creating a new file-group by a client according to one example.

FIG. 7 illustrates a flowchart for creating a new file-group by a Bio-cloud client according to one example. The process starts in step S710 and proceeds to step S720.

In step S720 the owner of the file-group to be created, inputs a name for the new file-group. The client may enter a name for the new file-group to be created on a display terminal of the client's device. The process then proceeds to step S730, wherein the owner generates a public and private manage access key for the new file-group to be created. Note that the manage access public key will be maintained in 306 in the access permission file, whereas the manage access private key would be included in the manage access block of the owner and other users with manage-access permission as depicted in FIG. 6.

The public/private keys can be randomly generated using a random number generator (RNG) or a pseudorandom number generator (PRNG). For instance, PRNG is a computer algorithm that produces data that appears random under analysis.

PRNGs may use system entropy to seed data in order to generate the keys. Alternatively, the keys may also be created using a passphrase and a key generation algorithm that usually involves a cryptographic hash function such as SHA-1.

In step S740, a public and private write-access key to be used for the new file-group are generated. Note that the write-access public key will be maintained in block 307 of the access permissions file, whereas the write-access private key will be included in the access block of the owner and other users with write-access permission as depicted in FIG. 5 and FIG. 6.

In step S750, a random access read key is generated which can be maintained in the read-write as well as the manage access blocks that are assigned to the users of the access permission file. The process then proceeds to step S760, wherein a bio-token of the owner of the file-group is generated. In order to generate the bio-token of the owner, the biometric information of the owner may be obtained from a biometrics reader (represented as 112 in FIG. 1) that may be of the type of a general fingerprint detector, high detection webcam for face recognition, speed recognition or alternatively can be obtained from a biometric certificate.

The process further proceeds to step S770, wherein an owner's access block is created by embedding the private manage access key, the private write-access key and the symmetric read-access key into 3 separate bio-tokens. Specifically, an owner's manage access block is created (access block as depicted in FIG. 6) that is stored in the owner's access block 302 of the access permission file 300.

The process then proceeds to step S780, wherein the new access permission file is created and signed by utilizing the manage access private key.

In step S790, the Bio-cloud client 107 creates a command to generate the file-group and transfers the command to the Bio-cloud server 101 via a communication network 106 as depicted in FIG. 1. The generated command to create the file-group is signed by the manage access private key by the client and transferred to the Bio-cloud server 101, whereupon it is processed in order to create the new file-group. Upon transmitting the command in step S790 the process ends in step S795.

Figure 8:
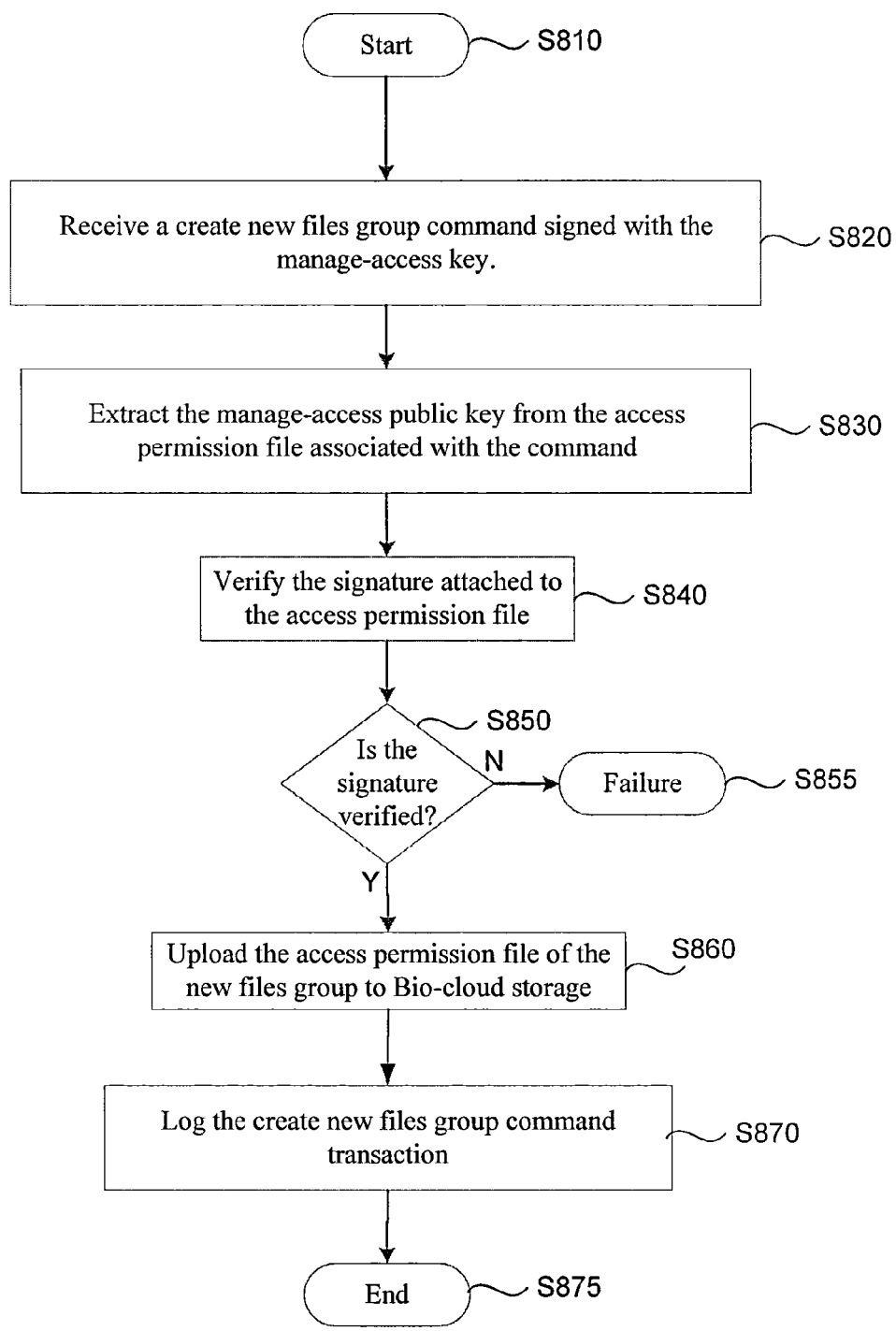
FIG. 8 illustrates a flowchart depicting the steps performed by a Bio-cloud server to create a file-group according to one example.

FIG. 8 depicts a flowchart illustrating the steps performed by a Bio-cloud server to create a new file-group.

The process starts in step S810 and proceeds to step S820. In step S820, the Bio-cloud server receives the create new file-group command that is transmitted by the client. The command is signed with the manage-access key private key of the owner of the file-group. Further, the command is associated with a user ID of the owner and corresponds to an access permission file (such as file 300 in FIG. 3) that the owner intends to create.

The process proceeds to step S830, wherein the Bio-cloud server 101 extracts the manage-access public key from the access permission file associated with the command. In step S840, the Bio-cloud server 101 verifies whether the signature attached to the access permission file is correct.

Specifically, the verification of the signature as shown in step S840 includes verifying whether the manage-access private key that is used to sign the create file-group command is valid, by utilizing the manage-access public key that is extracted from the access permission file. The process then proceeds to step S850, wherein a query is made to check if the signature is verified. If the response to the query is negative, the process moves to step S855 wherein a failure message may be transmitted by the Bio-cloud server 101 to the client 107. If the response to the query in step S850 is affirmative, the process proceeds to step S860.

In step S860, the Bio-cloud server 101 uploads the access permission file of the new file-group to the Bio-cloud storage. Moreover, as depicted in step S870, the Bio-cloud server 101 may optionally log the transaction (creating a file-group of the present embodiment) by maintaining a log of the created new file-group command that is transmitted by the client. Specifically, a logging module 103 as shown in FIG. 1, may maintain a log of the transactions performed by the server. Upon performing the step of logging the transaction the process ends in step S875.

Figure 9:
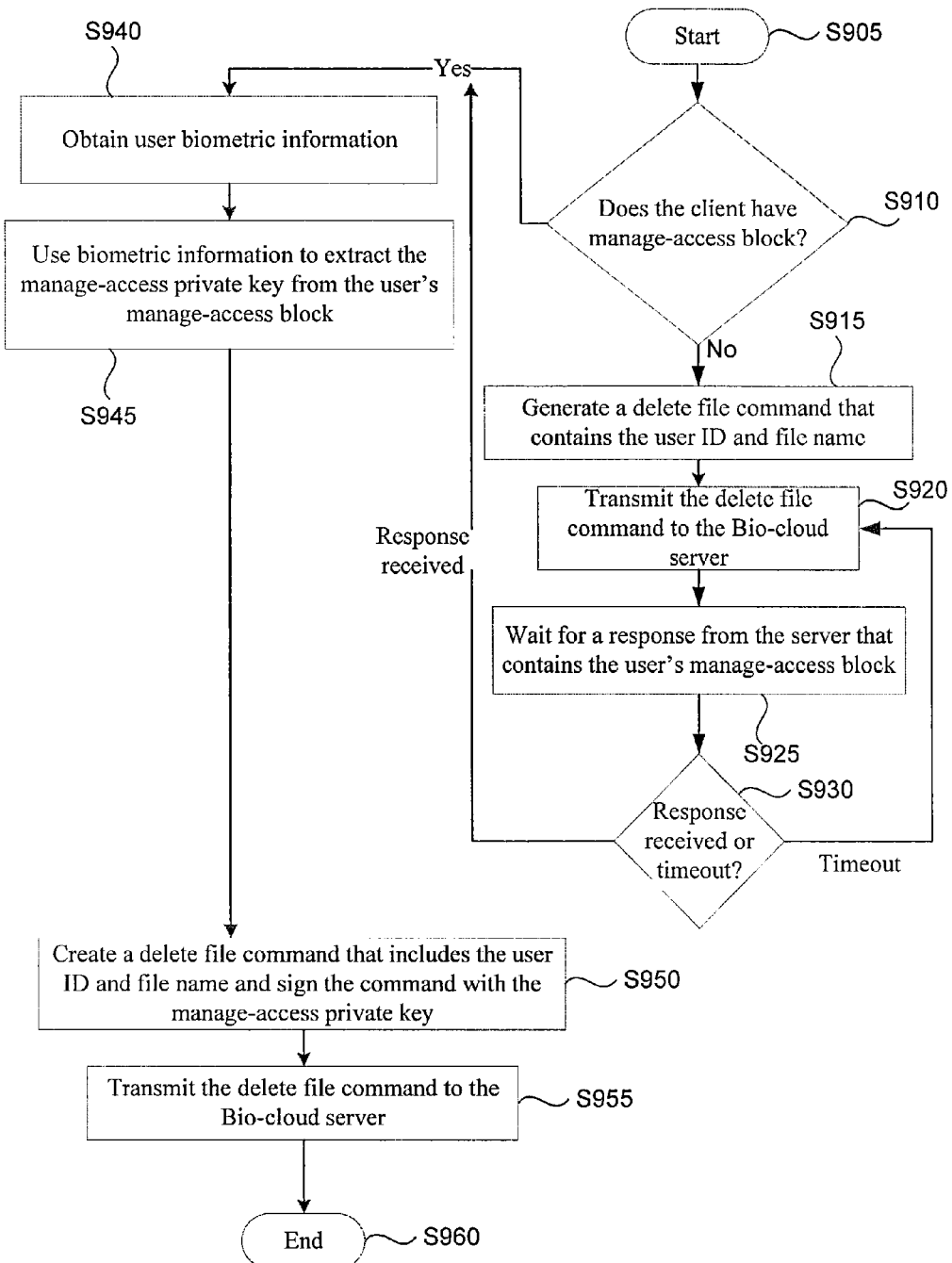
FIG. 9 illustrates a flowchart for deleting a file-group by the client according to one example.

FIG. 9 illustrates a flowchart depicting the steps performed by a Bio-cloud client to delete a file-group. The process starts at step S905 and proceeds to step S910. In step S910 a query is made to check if the client has a manage-access block. If the response to the query is negative, the process proceeds to step S915. If the response to the query is affirmative, the process proceeds to step S940.

In step S915, the client 107 generates a delete file command that includes the user ID (ID of the client) and a file name of the file-group to be deleted. The process then proceeds to step S920, wherein the delete file command is transmitted to the Bio-cloud server via the network 106.

Further in step S925, the user awaits to receive a response from the Bio-cloud server 101 that contains the user's manage-access block.

The process then proceeds to step S930, wherein a query is made to determine if a response is received from the Bio-cloud server 101. If the response to the query is negative (that is a time-out has occurred), the process loops back to step S920. On the other hand, if the response to the query in step S930 is affirmative, the process moves to step S940.

In step S940 the user's biometric information is captured, for example via the biometric reader 112 that is attached to the Bio-cloud client device. The process then proceeds to step S945, wherein the user's biometric information is used to extract the manage-access private key from the user's manage-access block.

The process then proceeds to step S950, wherein the client creates a delete file command that contains the user ID, the file name of the file-group to be deleted and signs the command with the manage-access private key that is extracted from step S945.

The process then proceeds to step S955, wherein the client transmits the delete file command for further processing to the Bio-cloud server 101. Upon transferring the command the process simply ends in step S960.

Figure 10:
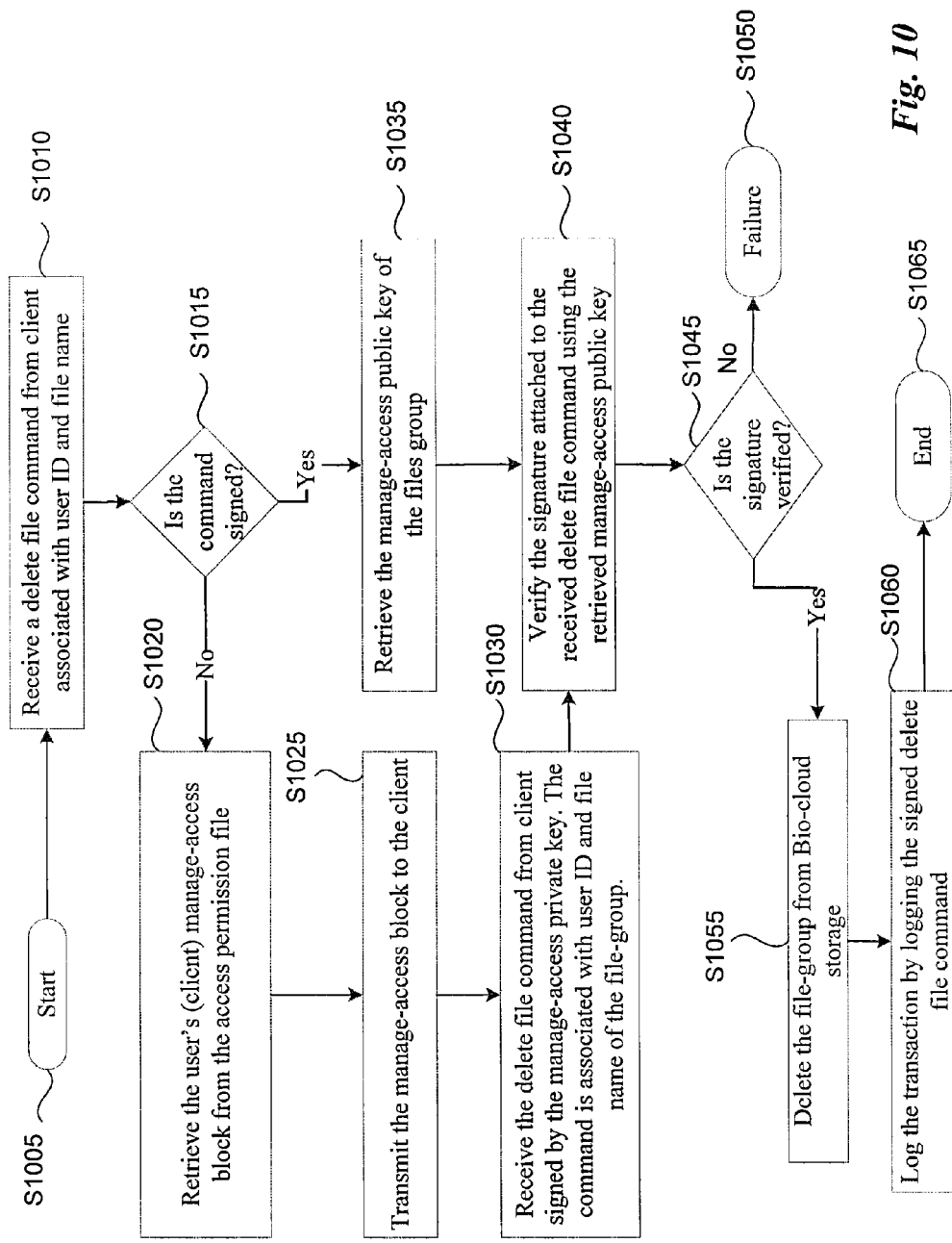
FIG. 10 illustrates a flowchart for deleting a file-group by the Bio-cloud server according to one example.

FIG. 10 is a flowchart depicting the steps performed by a Bio-cloud server to delete a file-group. The process starts in step S1005 and proceeds to step S1010. In step S1010 the Bio-cloud server 101 receives a delete file command that is transmitted from the client 107. Note that the transmitted command is associated with the user's ID and the file name of the file-group that is intended to be deleted.

In step S1015, a query is made to check if the received command has been signed by the client. If the response to the query is negative, the process proceeds to step S1020 and if the response to the query is affirmative, the process moves to step S1035, wherein the Bio-cloud server 101 extracts the manage-access public key of the file-group.

In step S1020, the Bio-cloud server 101 retrieves the user's manage-access block from the access permission file based on the user ID. The process then moves to step S1025, wherein the Bio-cloud server 101 transmits the manage-access block to the client. Further, in step S1030 the Bio-cloud server 101 anticipates that the client signs the delete file command by utilizing the manage-access private key (that is transmitted to the client via the manage-access block) and transmits it back to the Bio-cloud server 101. Note that the command is associated with a particular user ID and a file name of the file-group to be deleted. Upon receiving a signed command from the client, the process moves to step S1040. Furthermore, the steps S1020, S1025, and S1030 are performed in order to ascertain that the transmitted command from the client is signed with the manage-access private key.

In step S1040, the Bio-cloud server 101 verifies whether the signature attached to the received delete file command is valid. According to an embodiment, the Bio-cloud server 101 may verify the signature attached to the delete file command by retrieving the manage-access public key that is maintained in block 306 of the access permission file.

The process further moves to step S1045, wherein a query is made to check if the verification of step S1040 was successful. If the response to the query is negative, the process proceeds to step S1050, wherein a failure message may be transmitted by the Bio-cloud server to the client device 107. Note that such a message may be displayed on a display terminal of the Bio-cloud client 107, which may be a laptop, a desktop, a tablet or the like device.

If the response to the query in step S1045 is affirmative, the process proceeds to step S1055, wherein the Bio-cloud server 101 deletes the particular file-group from the Bio-cloud storage 104 as represented in FIG. 1.

Further, in step S1060 the Bio-cloud server 101 may optionally log the transaction of deleting a file-group by maintaining a log in a logging module 103. According to an embodiment the Bio-cloud server 101 may maintain a log by storing the signed delete file command from a particular client in the logging module. Upon performing the logging transaction as described in step S1060 the process ends in step S1065.

Figure 11A:
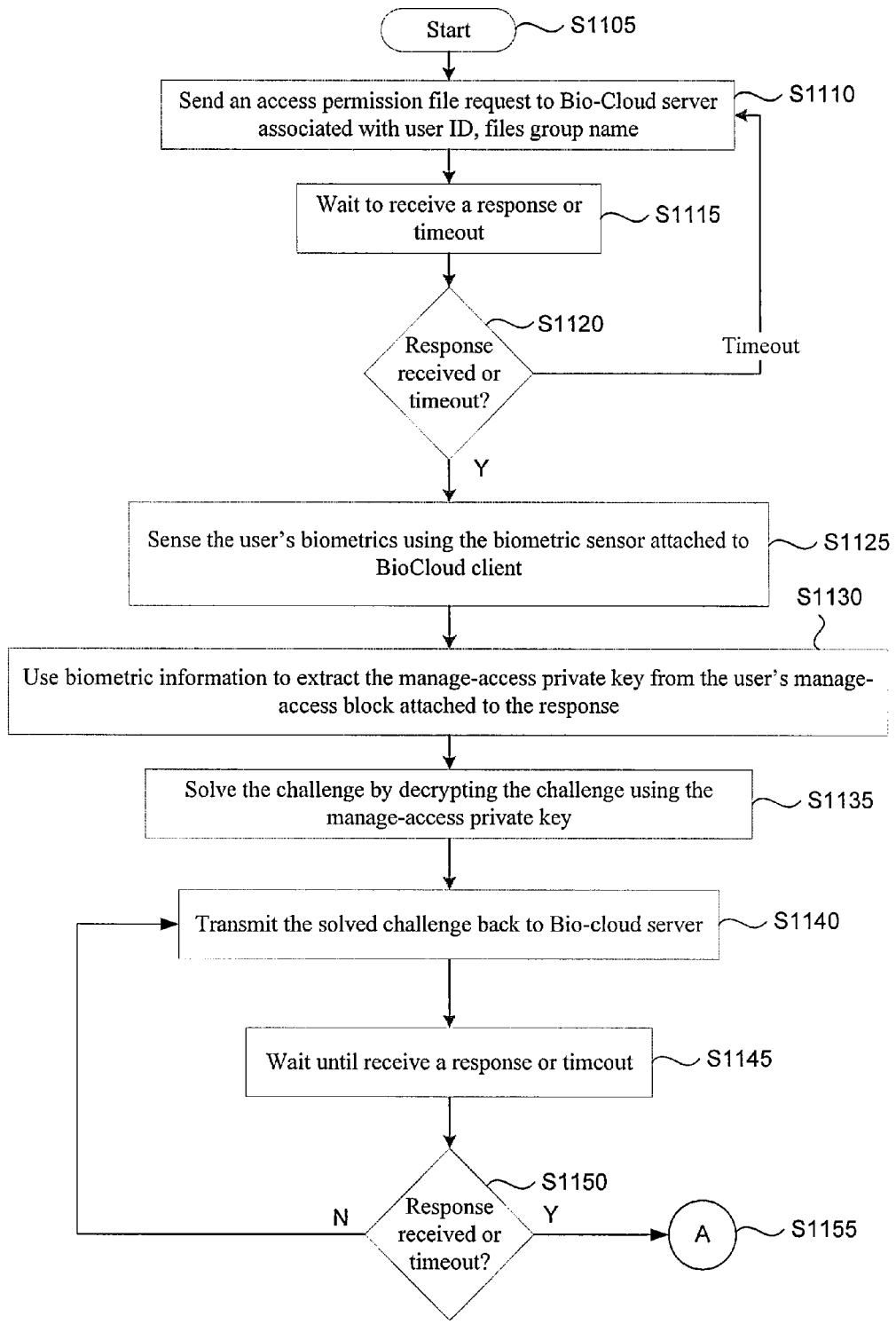
FIGS. 11A and 11B illustrate a flowchart for updating the file-group by the Bio-cloud client according to one example.
Figure 11B:
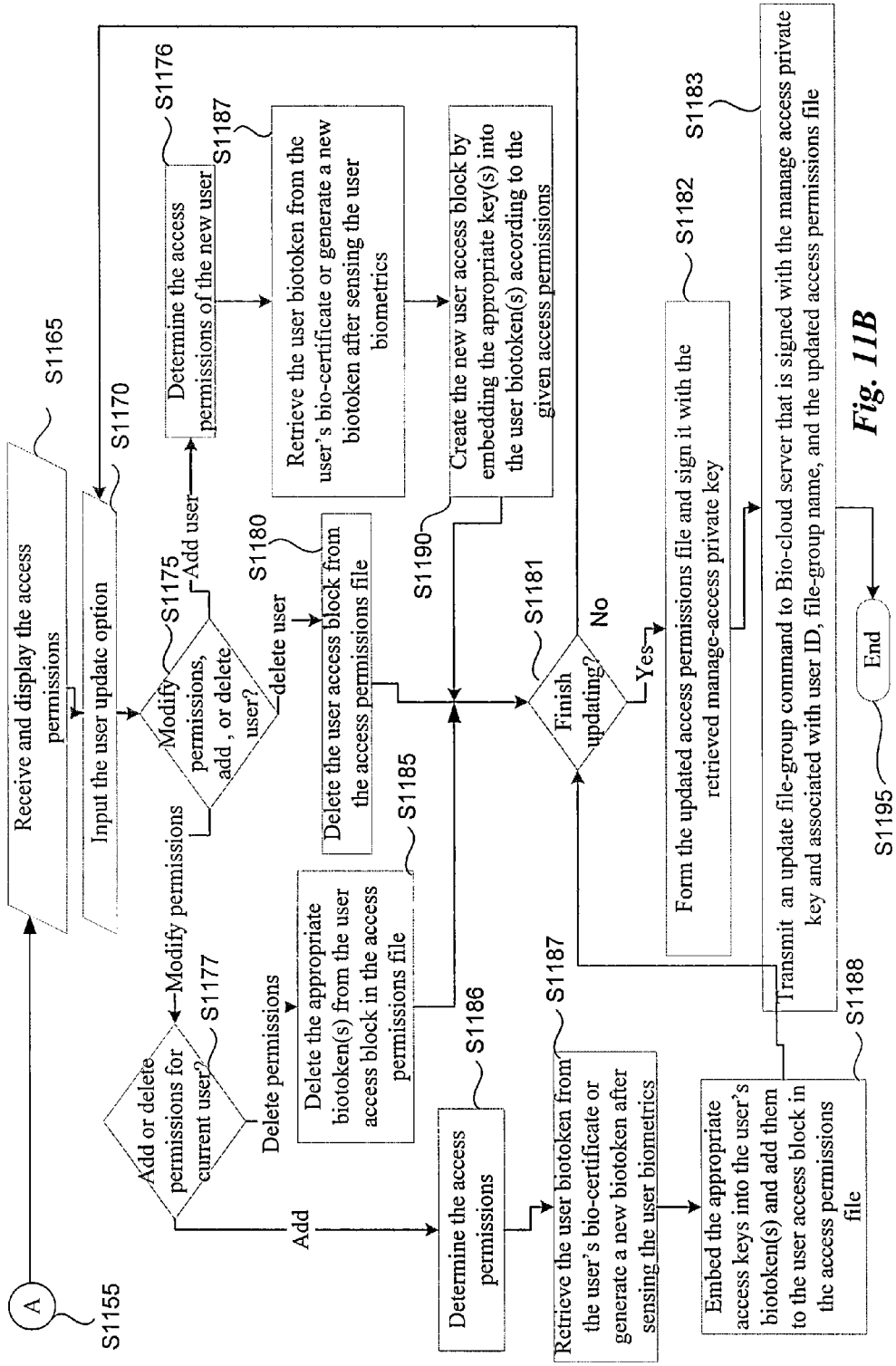

FIGS. 11A and 11B depict a flowchart illustrating the steps performed by a Bio-cloud client to update a file-group. The process starts in step S1105 and proceeds to step S1110.

In step S1110, the client transmits a request to access a permission file to the Bio-cloud server, wherein the request identifies the particular file-group that the client intends to modify/update. The file request transmitted by the client also includes the user ID of the client.

The process then proceeds to step S1115, wherein the Bio-cloud client waits for a response to be transmitted from the Bio-cloud server. Further, in step S1120 a query is made to check if a response is received or a predetermined time-out has occurred. If the response to the query in step S1120 is negative (i.e., a response is not received by the Bio-cloud client and a time-out has occurred) the process loops back to step S1110. On the other hand, if the response to the query in step S1120 is affirmative the process proceeds to step S1125.

In step S1125, the biometric information of the client is retrieved, for example, from a biometric sensor 112 attached to the Bio-cloud client device.

In step S1130, the captured biometric information of the client is utilized to extract a manage access private key from the user's manage access block that is attached to the response sent by the Bio-cloud server 101.

Further, step S1135 provides an enhanced security measure to ensure that a legitimate Bio-cloud client is trying to update a Bio-cloud access permission file. Specifically, in step S1135, a challenge question is presented to the Bio-cloud client 107. The challenge question can be decrypted by using the extracted manage access private key from step S1130. According to an embodiment of the present disclosure, the challenge question may be, for example, a random number that is inserted into the bio-token. A legitimate Bio-cloud client can decrypt the challenge question by using the manage access private key and thereby access the random number that is inserted into the bio-token.

The process then moves to step S1140, wherein the Bio-cloud client transmits the solved challenge to the Bio-cloud server.

In step S1145, the Bio-cloud client 107 enters a wait mode wherein the Bio-cloud client waits to receive a response from the Bio-cloud server.

In step S1150, a query is made to check if a response is received by the Bio-cloud client. If the response to the query of step S1150 is negative, the process loops back to step S1140. If the response to the query is affirmative, the process proceeds to step S1155.

Steps S1155 to steps S1195 of the process of updating a file-group that is performed by a Bio-cloud client are described with reference to FIG. 11B.

Upon receiving a response from the Bio-cloud server the process moves from step S1155 to step S1165. In step S1165, the Bio-cloud client receives the access permission file that is transmitted by the Bio-cloud server.

According to an embodiment the Bio-cloud server 101 may be configured to display the access permission file on a display terminal of the Bio-cloud client device. Further, several options to modify/update the access permission file may be displayed on the display terminal, where after the Bio-cloud client may input an update preference as shown in step S1170.

In step S1175, a query is made to determine whether a Bio-cloud client 107 intends to modify permissions, add permissions or delete a user group from the access permissions file.

If the Bio-cloud client 107 intends to delete a user from the access permissions file the process proceeds to step S1180, wherein the intended user access block is deleted from the access permissions file. Note that the Bio-cloud client is enabled to perform this action (of deleting a user access block from the access permission file) as the Bio-cloud client is a legitimate user that has access to the manage access private key.

If the response to the query in step S1175 is that of adding a new user to the access permission file the process proceeds to step S1176, wherein the Bio-cloud client 107 determines the level of access permission to be granted to the new user. Thereafter, the process proceeds to step S1187, wherein the new user's bio-token is either obtained from the bio-certificate or a new bio-token for the user is generated after obtaining the user's biometric information. Upon generating the new user's bio-token the process proceeds to step S1190, wherein the new user's access block is embedded with the appropriate keys into the user's bio-token based on the level of access granted to the new user. Specifically, the new user's access block (such as 303, 304, 305, as shown in FIG. 3) is created in the access permissions file. Upon creating the new user's access block the process proceeds to step S1181.

If the response to the query of step S1175 is that of modifying an access permission of a user the process proceeds to step S1177. In step S1177, a query is made to determine whether the Bio-cloud client intends to add or delete permission for a selected user. If the response to the query is one of deleting permission, the process proceeds to step S1185. If the response to the query of step S1177 is that of adding permission to the selected user, the process proceeds to step S1186.

In step S1185, the Bio-cloud client 107 deletes the appropriate bio-tokens from the user's access block in the access permissions file. For instance, a user that is initially granted a manage access block may be changed to a write-access block by deleting the manage access private key from the user's access block. The process thereafter proceeds to step S1181.

In step S1186, the Bio-cloud client determines a level of access to be added to the selected user. The process step S1187 retrieves the user's bio-token either from the user's bio-certificate or alternately may generate a new bio-token for the user based on the user's biometric information. The process thereafter proceeds to step S1188, wherein the appropriate access keys are embedded into the user's bio-tokens and are added to the user's access block in the access permission file. For instance, if the selected user initially has a write-access manage block, the Bio-cloud client may determine to add permissions to the selected user such that the user is upgraded to have a manage access block. This functionality of adding a manage access permission to the selected user can be performed by the Bio-cloud client by appropriately inserting a manage access private key into the user's bio-token. The process thereafter proceeds to step S1181.

In step S1181, a query is made to determine whether the updating process has been completed. If the response to the query is negative, the process loops back to step S1170, wherein the Bio-cloud client may perform another update operation. If the response to the query of step S1181 is affirmative, the process proceeds to step S1182. In step S1182, the updated access permissions file is signed by the Bio-cloud client with the help of the manage access private key that is extracted in step S1130.

In step S1183, the Bio-cloud client transmits an update file-group command to the Bio-cloud server. Specifically, the update command is signed with the manage access private key and is further associated with the Bio-cloud client's user ID, the file-group name and the updated file-group access permission file. The process thereafter ends in step S1195.

Figure 12:
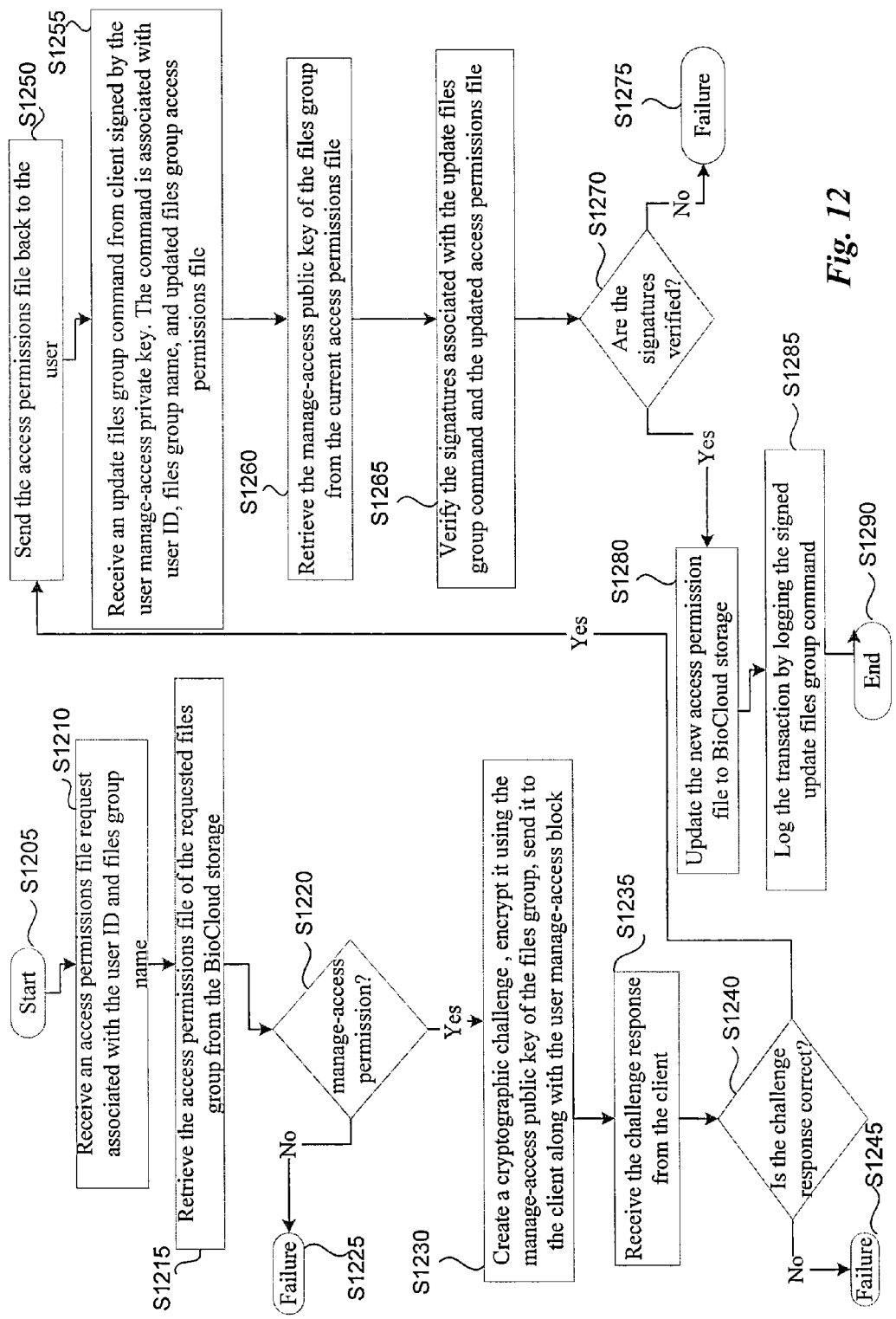
FIG. 12 illustrates a flowchart for updating file-group by the Bio-cloud server according to one example.

FIG. 12 illustrates a flowchart depicting the steps performed by a Bio-cloud server to update a file-group. The process starts at step S1205 and proceeds to step S1210. In step S1210, the Bio-cloud server 101 receives an access permission file request associated with a user ID and a file-group name.

The process then proceeds to step S1215, wherein the Bio-cloud server 101 retrieves the access permission file from the Bio-cloud storage based on the file-group's name. The process then proceeds to step S1220, wherein a query is made to determine if the Bio-cloud client requesting permission to update the access permission file has been assigned a manage access permission block.

If the response to the query in step S1220 is negative, the process proceeds to step S1225 wherein a failure message may be transmitted by the Bio-cloud server 101 to be displayed upon a display terminal of the Bio-cloud client. If the response to the query in step S1220 is affirmative, the process proceeds to step S1230, wherein the Bio-cloud server 101 creates a cryptographic challenge that is encrypted using a manage access public key of the requested file-group. This cryptographic challenge is transmitted to the Bio-cloud client 107 along with the user's manage access block. As stated with reference to FIG. 11A (step S1135), the cryptographic challenge may be a random number that is embedded within a bio-token of the user.

The process then proceeds to step S1235, wherein a response to the challenge is received by the Bio-cloud client that is transmitted from the Bio-cloud server. Further, in step S1240, the Bio-cloud server queries to determine if the response to the transmitted challenge is correct. If the response to the query in step S1240 is negative, the Bio-cloud server 101 may be configured to transmit a failure message that is displayed on a display terminal of the Bio-cloud client 107 (step S1245). On the other hand, if the response to the query in step S1240 is affirmative, the process proceeds to step S1250, wherein the access permission file is transmitted by the Bio-cloud server to the Bio-cloud client 107.

In step S1255, the Bio-cloud server receives the updated access permission file along with a file-group command from the Bio-cloud client. The update file-group command is signed by the Bio-cloud client's manage access private key. Further, as stated in step S1183 of FIG. 11B, the update command may be associated with the Bio-cloud client's user ID, a file-group name and an updated access permission file.

In step S1260, upon receiving the access permission file, the Bio-cloud server 101 retrieves the manage access public key of the updated file-group. In step S1265, the Bio-cloud server 101 verifies whether the signatures associated with the updated file-group command and the updated access permissions file are valid.

In step S1270, the Bio-cloud server 101 queries to determine whether the signatures are verified. Specifically, if the response to the query in step S1270 is negative, the process proceeds to step S1275, wherein the Bio-cloud server 101 transmits a failure message to be displayed on the display terminal of the Bio-cloud client device 107. On the other hand if the response to the query in step S1270 is affirmative, the process proceeds to step S1280, wherein the Bio-cloud server updates the new access permissions file and stores the updated file in the Bio-cloud storage. Thereafter, in step S1285 the Bio-cloud server 101 may optionally log the updated transaction by logging in a signed update file-group command that is transmitted by the respective Bio-cloud client and maintains this command in a transition log. The process after optionally logging in the transaction ends in step S1290.

Figure 13:
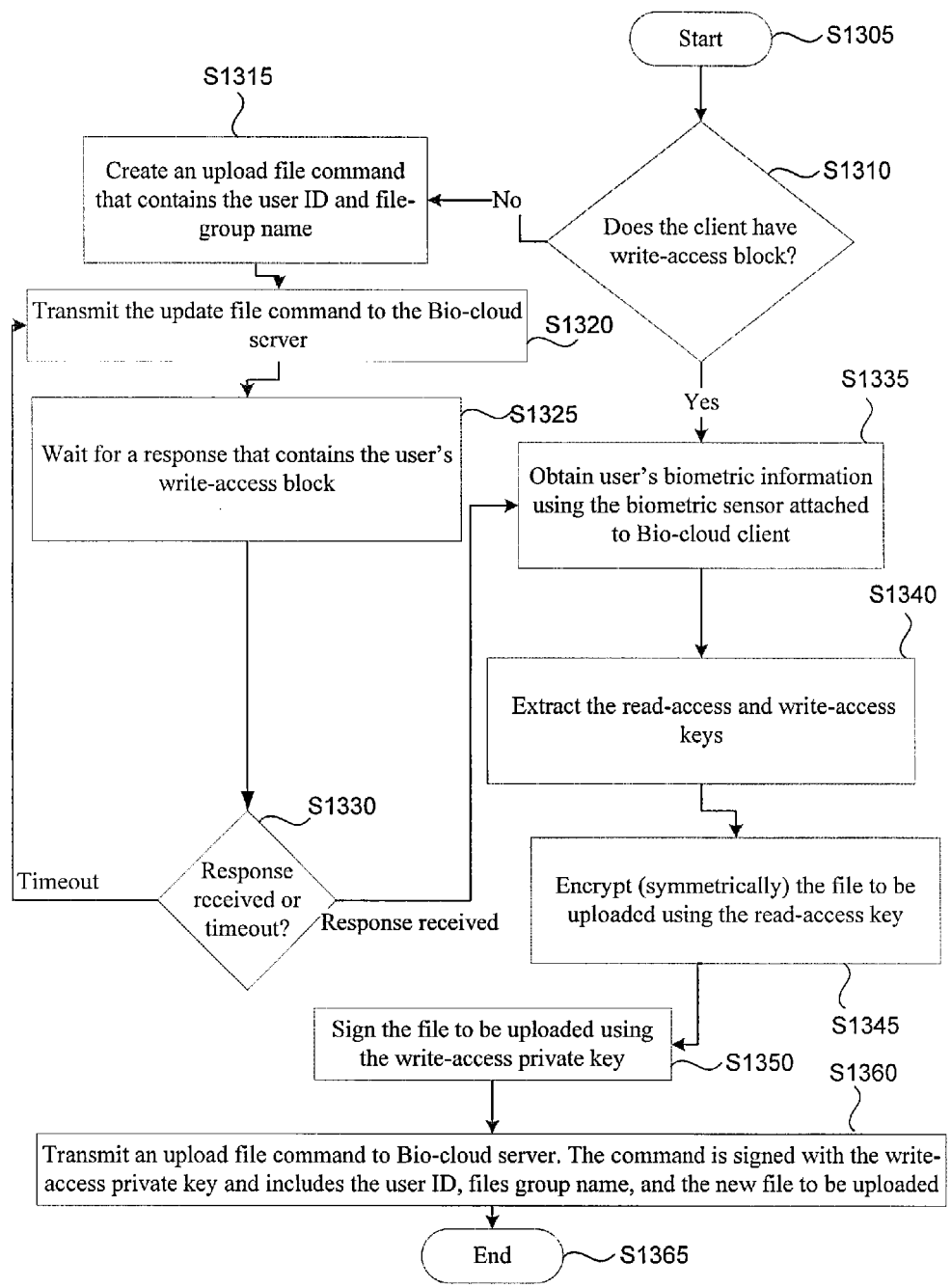
FIG. 13 illustrates a flowchart depicting the steps performed by the Bio-cloud client to upload a new file according to one example.

FIG. 13 illustrates according to an example a flowchart that depicts the steps performed by a Bio-cloud client to upload a new file in a particular access permission file that is stored in the Bio-cloud storage.

The process starts in step S1305 and proceeds to step S1310. In step S1310, a query is made to determine whether the client 107 has a write access permission block that is assigned to him. If the response to the query is negative, the process proceeds to step S1315. If the response to the query is affirmative, the process proceeds to step S1335.

In step S1315, the Bio-cloud client creates an upload file command that contains the client's ID and a file-group name in which the Bio-cloud client intends to upload a new file. The process thereafter proceeds to step S1320, wherein the Bio-cloud client transmits the upload file command to the Bio-cloud server.

The process in step S1325 waits for a response to be received from the Bio-cloud server 101, wherein the response contains the Bio-cloud client's write access block. Further, in step S1330 a query is made to determine if a response is received from the Bio-cloud server. If the response to the query is negative (that is, a time-out has occurred), the process loops back to step S1320. However, if the response is received by the Bio-cloud client, the process proceeds to step S1335, wherein the Bio-cloud client's biometric information is obtained via the biometric sensor that is attached to the Bio-cloud client device.

The process then proceeds to step S1340, wherein the Bio-cloud client's biometric information is utilized to extract the read access and write access key from the relevant user access block that is attached to the response which is sent from the Bio-cloud server. Note that the write access block of a particular user has two bio-tokens corresponding to a write access private key and a symmetric read access key.

In step S1340, upon extracting the read access and the write access keys from the user's access block, the file to be uploaded is encrypted in a symmetric manner by using the read access key (step S1345). The process then proceeds to step S1350, wherein the Bio-cloud client signs the file to be uploaded using the write access private key.

Upon generating the file to be uploaded in step S1350, the process in step S1360 transmits an upload file command to the Bio-cloud server 101. Note that this command is signed with the write access private key and also includes the Bio-cloud client's user ID, a file-group name (corresponding to the file-group that the uploaded file belongs to) and the entire content of the new file that is to be uploaded. The process thereafter ends in step S1365.

Figure 14:
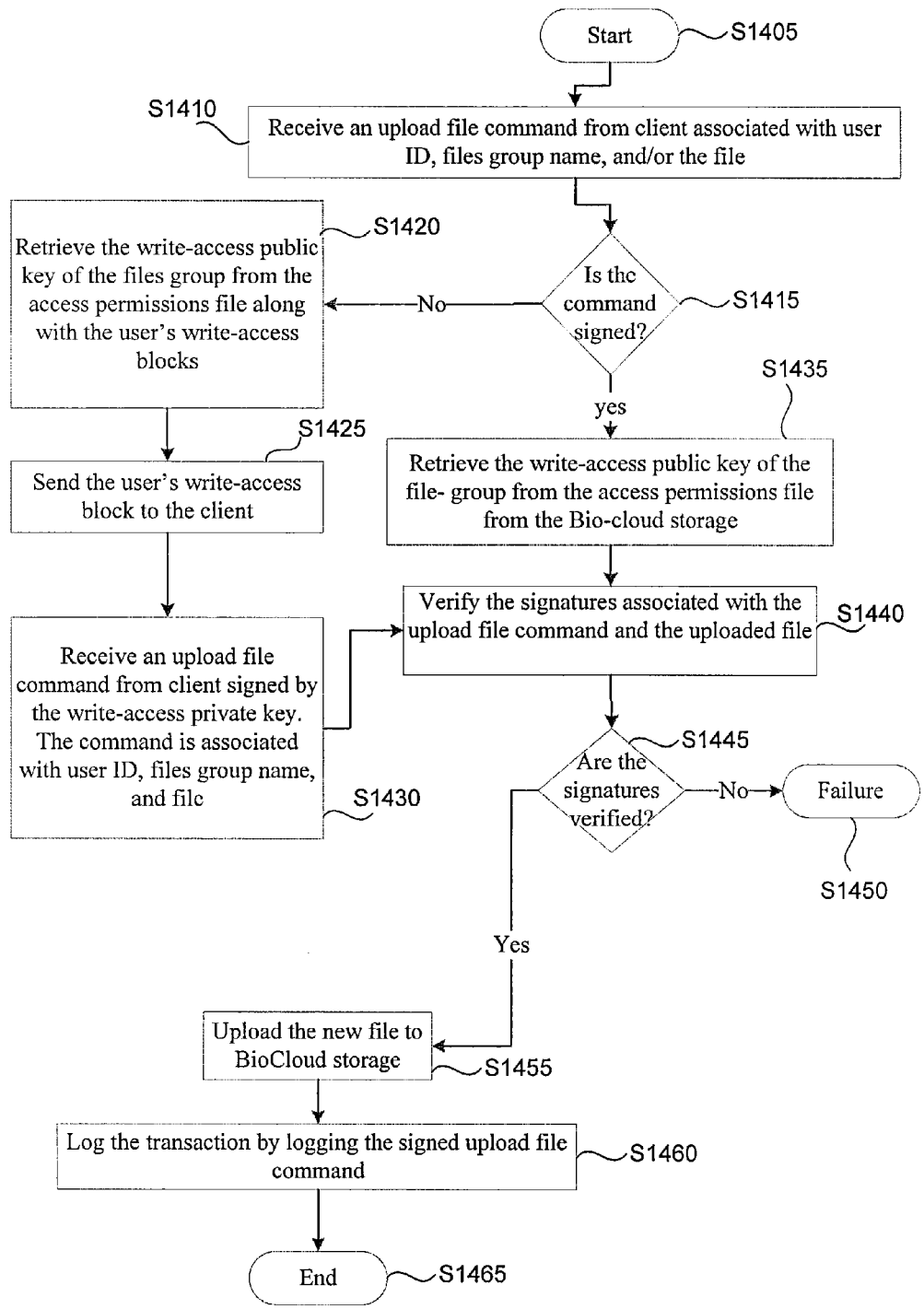
FIG. 14 illustrates a flowchart depicting the steps performed by the Bio-cloud server in uploading a new file according to one example.

FIG. 14 illustrates according to an example, a flowchart that depicts the steps performed by a Bio-cloud server to upload a new file. The process starts in step S1405 and proceeds to step S1410.

In step S1410, the Bio-cloud server 101 receives an upload file command that is transmitted by the Bio-cloud client. Note that the command is associated with a Bio-cloud client's ID, a file-group name, and also includes the updated file that is to be uploaded to the access permission file. The process then proceeds to step S1415, wherein a query is made to determine if the command that is transmitted by the Bio-cloud client is signed. If the response to the query is negative, the process proceeds to step S1420, else if the response to the query is affirmative, the process proceeds to step S1435.

In step S1420, the Bio-cloud server 101 retrieves the write access public key of the particular file-group from the access permission file and also retrieves the user's write access block. The process then moves to step S1425, wherein the retrieved write access blocks are transmitted to the Bio-cloud client.

In step S1430, upon transmitting the users write access block to the Bio-cloud client, the Bio-cloud server anticipates that the Bio-cloud client would transmit an upload file command that is signed by the write access private key. In step S1430, the Bio-cloud server receives an upload file command transmitted by the client wherein the command is associated with a user ID, a file-group name and the file that is to be uploaded. The process thereafter proceeds to step S1440.

In step S1435, the Bio-cloud server 101 retrieves the write-access public key of the file-group from the access permission file that is stored in the Bio-cloud storage. The process in step S1440 verifies if the signatures corresponding to the upload file command and the file to be uploaded are not erroneous. The process in step S1445 makes a query to determine whether the signatures are verified. Specifically, the Bio-cloud server 101 may utilize the write access public key that is retrieved in step S1435 to perform this task. If the response to the query is negative, the process proceeds to step S1450 wherein the Bio-cloud server may be configured to display a failure message on the display terminal of the Bio-cloud client. However, if the response to the query in step S1445 is affirmative, the process proceeds to step S1455 wherein the Bio-cloud server uploads the new file in the access permission file and saves the new file in the Bio-cloud storage. The process thereafter proceeds to step S1460, wherein the Bio-cloud server may optionally log the upload transaction performed by the Bio-cloud client. As stated previously, the Bio-cloud server may maintain a log of the upload file command that is signed by a particular Bio-cloud client and maintain a copy in a logging module. The process thereafter ends in step S1465.

Figure 15:
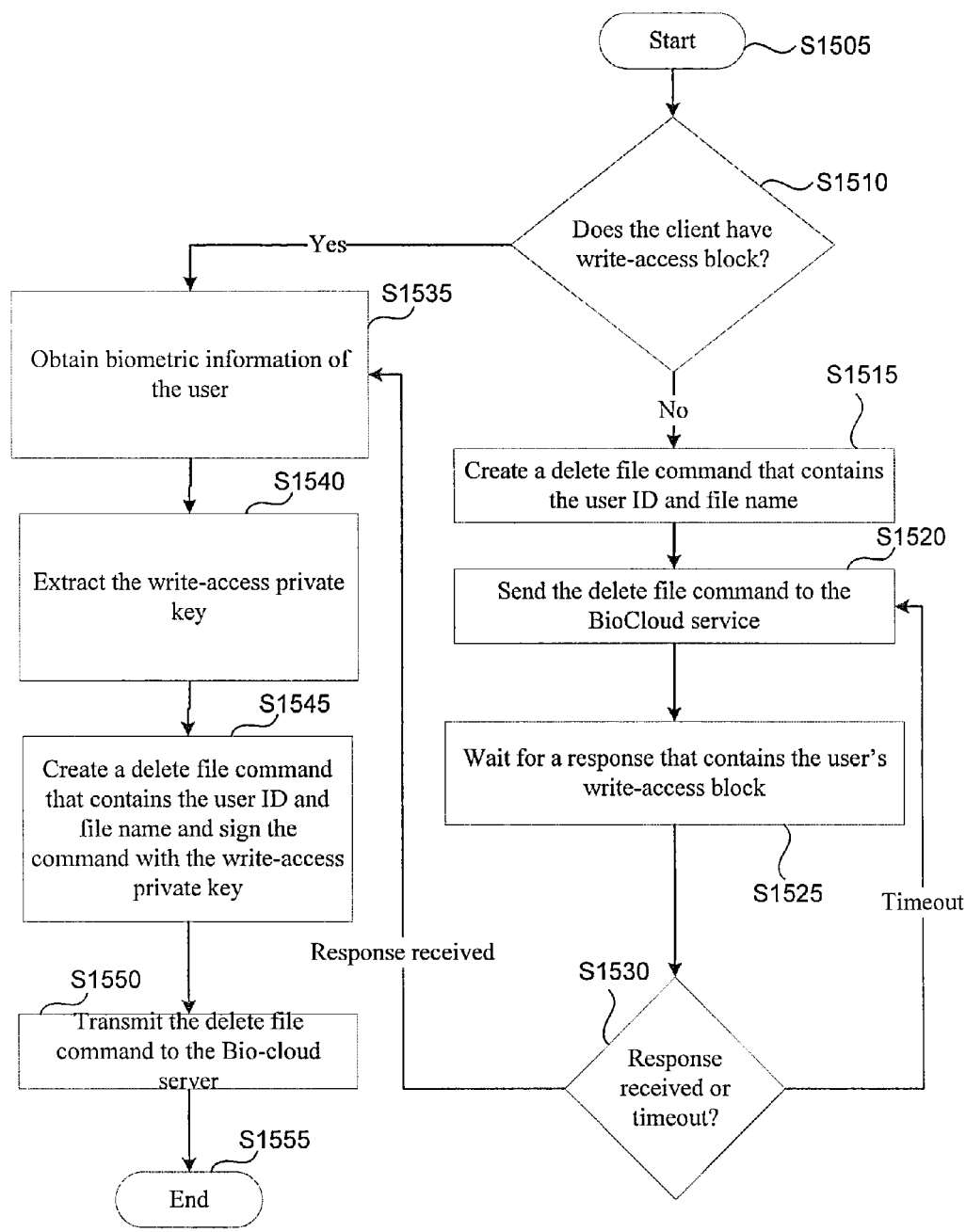
FIG. 15 illustrates a flowchart for Bio-cloud client deleting a file according to one example.

FIG. 15 depicts according to an embodiment, a flowchart that illustrates the steps performed by a Bio-cloud client to delete a file. The process starts in step S1505 and proceeds to step S1510. In step S1510, a query is made to determine whether the Bio-cloud client has a write access block. If the response to the query is affirmative, the process proceeds to step S1535, whereas if the response to the query is negative, the process proceeds to step S1515.

In step S1515, the Bio-cloud client 107 creates a delete file command that includes a user ID and a file name that is to be deleted. The process then proceeds to step S1520, wherein the Bio-cloud client transmits the delete file command to the Bio-cloud server via the communication network 106 (as represented in FIG. 1). Further, in step S1525 the Bio-cloud client enters a wait mode, wherein the Bio-cloud client waits to receive a response from the Bio-cloud server that includes the user's write access block.

The process in step S1530 makes a query to determine if a response is received by the Bio-cloud server. If the response to the query is negative (that is, a time-out has occurred), the process loops back to step S1520. However, if the response to the query in step S1530 is affirmative, the process proceeds to step S1535.

In step S1535, the Bio-cloud client's 107 biometric information is obtained, for example, via a biometric sensor attached to the Bio-cloud client's device. The process then proceeds to step S1540, wherein the biometric information of the user is utilized to extract the write access private key from the user's write access block.

Further, in step S1545, the Bio-cloud client 107 creates a delete file command that contains a user ID, a file name that is to be deleted and signs the command with the write access private key.

Further, in step S1550, the Bio-cloud client transmits the delete file command to the Bio-cloud server. Thereafter the process ends in step S1555.

Figure 16:
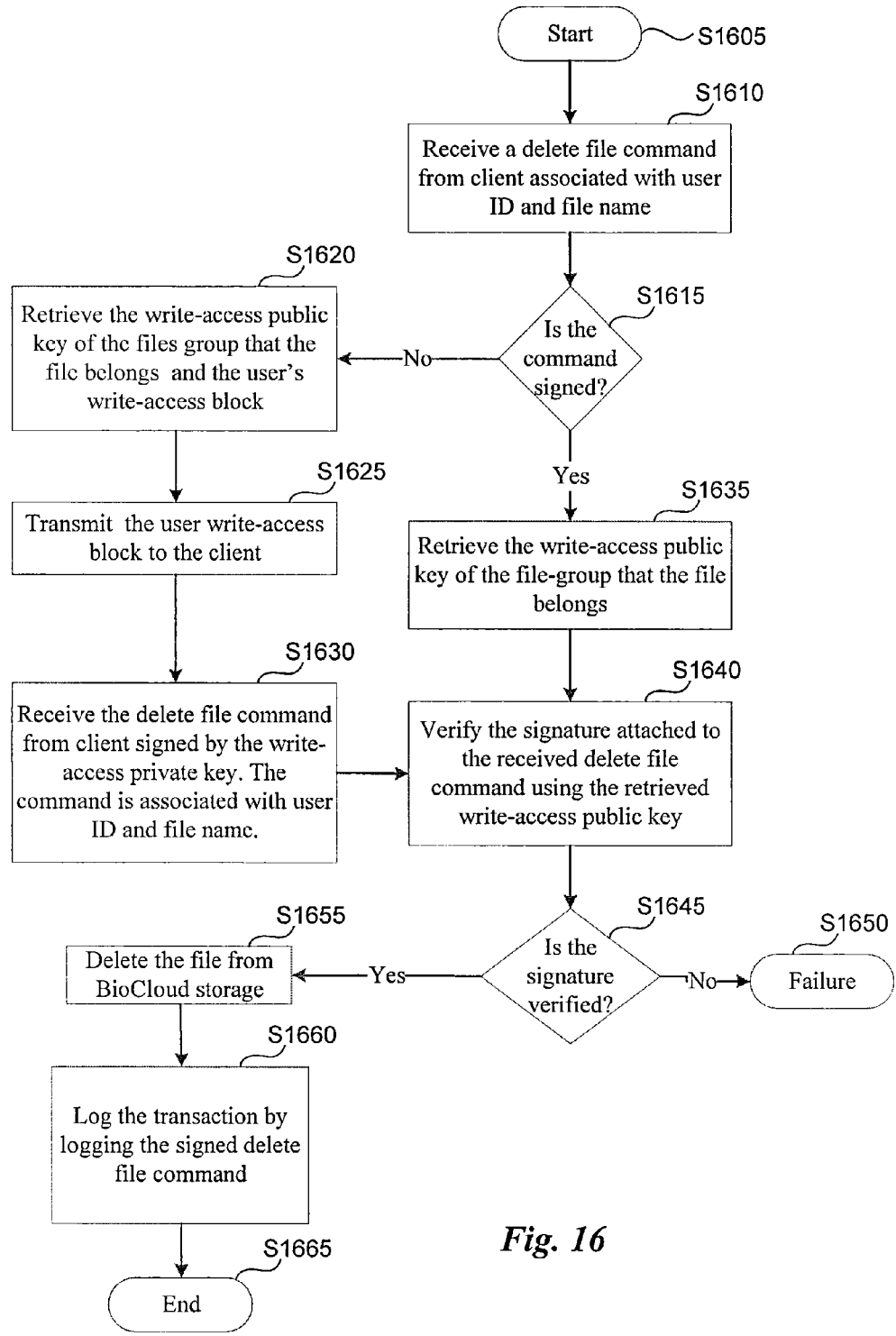
FIG. 16 illustrates a flowchart depicting the steps performed by the Bio-cloud server in deleting a file according to one example.

FIG. 16 depicts a flowchart according to an embodiment illustrating the steps performed by a Bio-cloud server to delete a file. The process starts in step S1605 and proceeds to step S1610. In step S1610, the Bio-cloud server receives a delete file command that is transmitted by a Bio-cloud client. The command is associated with a user ID and a file name of the file that is intended to be deleted.

The process thereafter proceeds to step S1615, wherein a query is made to determine if the received command has been signed by the Bio-cloud client. If the response to the query is negative, the process proceeds to step S1620. However, if the response to the query is affirmative, the process proceeds to step S1635.

In step S1620, the Bio-cloud server 101 retrieves the write access public key of the file-group that the particular file to be deleted belongs. Further, the Bio-cloud server also extracts the user's write access block (for instance, based on the user ID) from the access permission file.

In step S1625, the Bio-cloud server transmits the write access block to the Bio-cloud client. In step S1630, the Bio-cloud server receives a delete file command that is signed by the Bio-cloud client. Note that the Bio-cloud client utilizes the write access private key to sign the delete file command. Moreover, the command is also associated with a user ID and a file name of the file that is to be deleted. The process thereafter proceeds to step S1640.

If the response to the query in step S1615 was affirmative, the process in step S1635 retrieves the write access public key of the file-group that the particular file belongs. Further, in step S1640 the Bio-cloud server verifies the signature attached to the received delete file command using the extracted write access public key. Thereafter, the process proceeds to step S1645, wherein a query is made to determine if the signature is verified. If the response to the query is negative, the process proceeds to step S1650, wherein the Bio-cloud server may be configured to transmit a failure message to be displayed on a display terminal of the Bio-cloud client device. However, if the response to the query is affirmative, the process proceeds to step S1655, wherein the particular file is deleted by the Bio-cloud server from the Bio-cloud storage.

Further, the process in step S1660, may optionally log the transaction of deleting a particular file by maintaining a log of the delete file command that is transmitted by the Bio-cloud client in a logging module. The process thereafter ends in step S1665.

Figure 17:
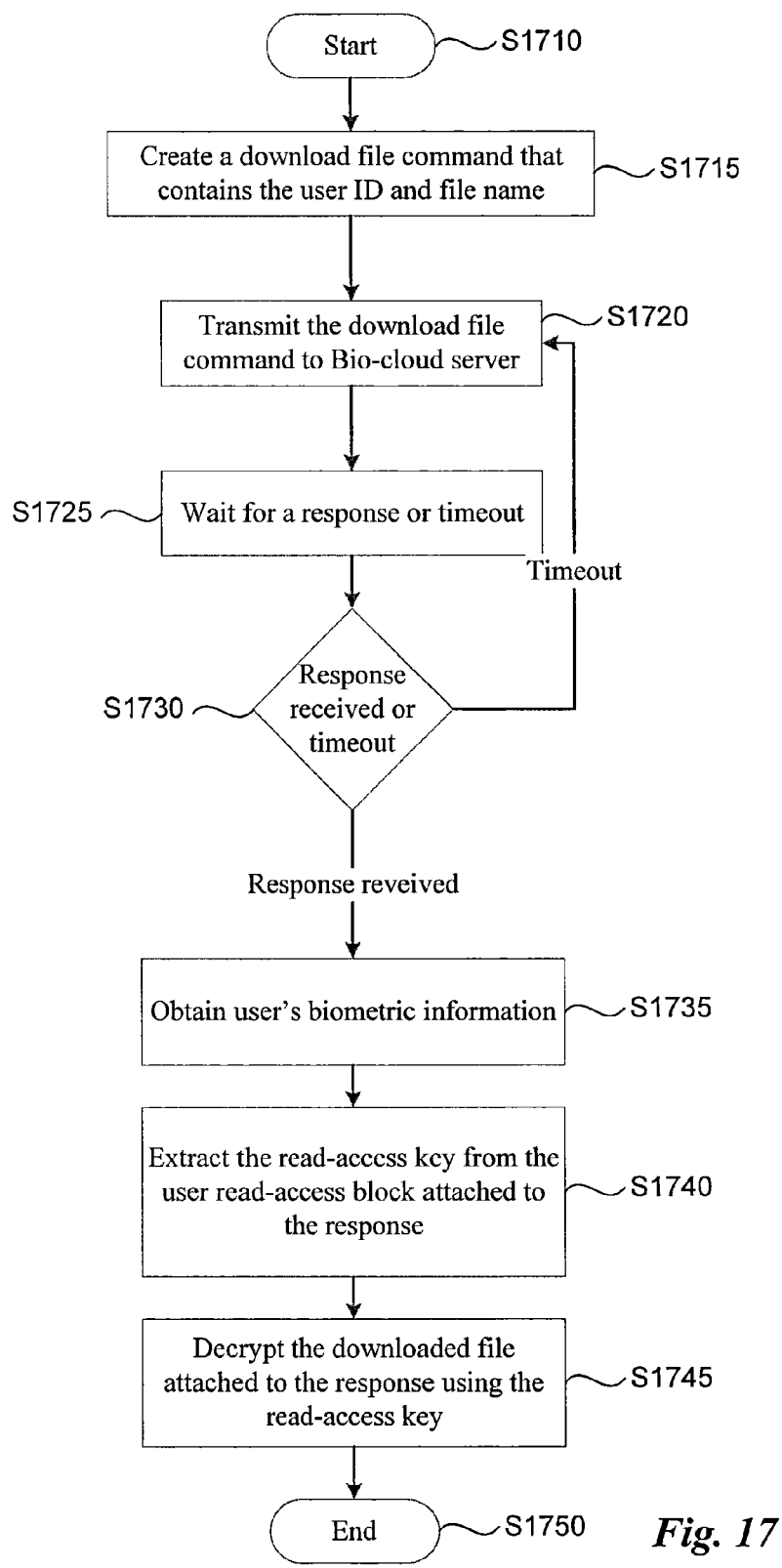
FIG. 17 illustrates a flowchart depicting the steps performed by the Bio-cloud client for downloading a file according to one example.

FIG. 17 depicts according to an example a flowchart illustrating the steps performed by a Bio-cloud client to download a file from the Bio-cloud server. The process starts in step S1710 and proceeds to step S1715.

In step S1715, the Bio-cloud client creates a download file command that includes a user ID and a file name that is intended to be downloaded from the Bio-cloud. Further, in step S1720 the Bio-cloud client transmits the download file command to the Bio-cloud server 101. In step S1725, the Bio-cloud client 107 enters a wait mode wherein the Bio-cloud client awaits to receive a response to be transmitted from the Bio-cloud server.

In step S1730, a query is made to determine if the Bio-cloud client has received a response from the Bio-cloud server. If the response to the query in step S1730 is negative (that is, a time-out has occurred), the process loops back to step S1720. However, if the Bio-cloud client receives a response from the Bio-cloud server (the response to the query in step S1730 is affirmative), the process proceeds to step S1735.

In step S1735, the biometric information of the Bio-cloud client is obtained via a biometric sensor that may be attached to the Bio-cloud client device. Further, in step S1740 the biometric information of the client is utilized to extract the read access key from the read access block that is attached to the response that is transmitted by the Bio-cloud server.

In step S1745, the Bio-cloud client decrypts the downloaded file that is attached to the response by utilizing the read access key. Thereafter, the process ends in step S1750.

Figure 18:
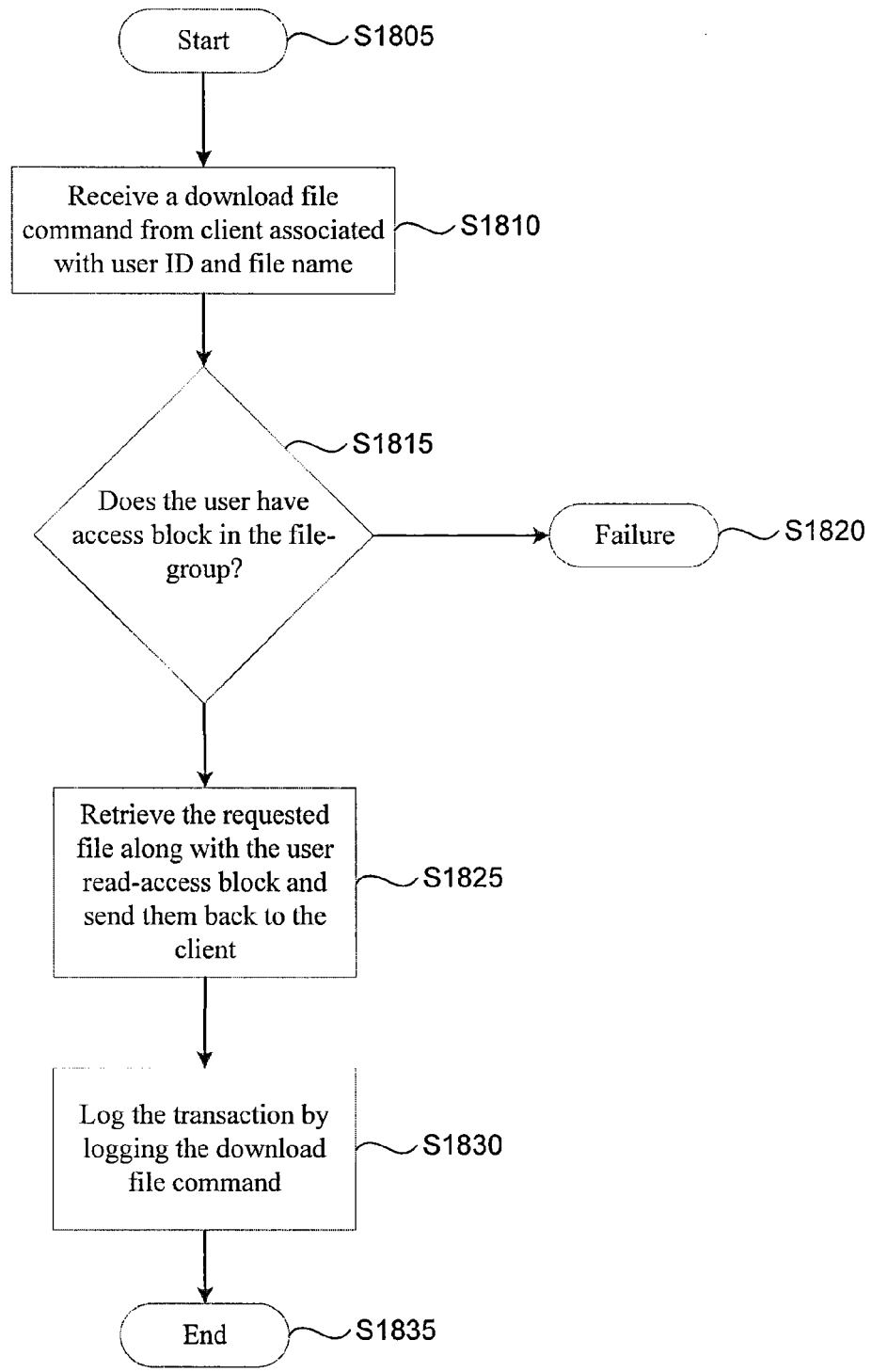
FIG. 18 illustrates a flowchart depicting the steps performed by a Bio-cloud server in downloading a file according to one example.

FIG. 18 depicts according to an example a flowchart that illustrates the steps performed by a Bio-cloud server in downloading a particular file. The process starts in step S1805 and proceeds to step S1810.

In step S1810, the Bio-cloud server receives a download file command from the Bio-cloud client. The download file command includes a user ID and a file name that the Bio-cloud client intends to download.

In step S1815, a query is made to determine whether the user ID (corresponding to the user that transmits the download command), have an access block in the file-group. If the response to the query is negative, the process proceeds to step S1820 wherein the Bio-cloud server may be configured to transmit a failure message that may be displayed on a display terminal of the Bio-cloud client device. However, if the response to the query is affirmative, the process proceeds to step S1825, wherein the Bio-cloud server retrieves the requested file along with the user's read access block and transmits them to the Bio-cloud client.

The process then proceeds to step S1830, wherein the Bio-cloud server may optionally log the download file transaction by maintaining a log of the download file command that is transmitted by the Bio-cloud client in a logging module. Thereafter, the process ends in step S1835.

Figure 19:
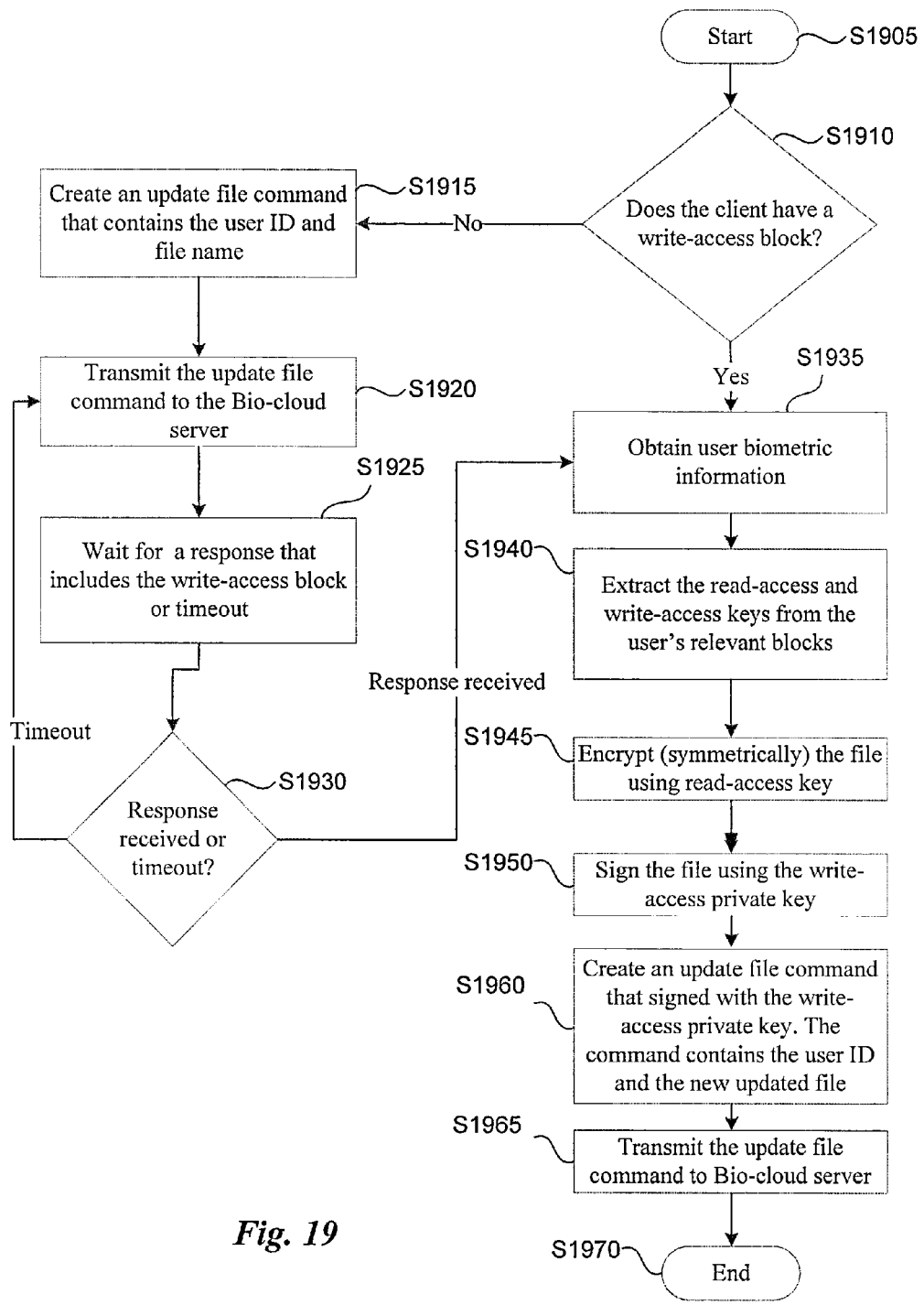
FIG. 19 illustrates a flowchart depicting the steps performed by the Bio-cloud client for updating a file according to one example.

FIG. 19 depicts according to an embodiment a flowchart illustrating the steps performed by a Bio-cloud client to update a file belonging to a particular file-group. The process starts in step S1905 and proceeds to step S1910.

In step S1910, a query is made to determine whether the client has a write access block. If the response to the query is negative, the process proceeds to step S1915. However, if the response to the query is affirmative, the process proceeds to step S1935.

In step S1915, the Bio-cloud client creates an update file command that includes a user ID and a file name of the file that is intended to be updated. Thereafter, the process proceeds to step S1920, wherein the Bio-cloud client transmits the update file command to the Bio-cloud server. Further, in step S1925 the Bio-cloud client enters a wait mode wherein the Bio-cloud client waits to receive a response containing the user's write access block from the Bio-cloud server.

In step S1930, a query is made to determine whether the Bio-cloud client has received a response from the Bio-cloud server. If the response to the query is negative (that is, a time-out has occurred), the process loops back to step S1920. However, if the response to the query in step S1930 is affirmative, the process proceeds to step S1935.

In step S1935, the user's biometric information is obtained, for example, via a biometric sensor that is attached to the Bio-cloud client device. In step S1940, the user's biometric information is utilized to extract the read access and write access keys from the user's access block.

Further, the process in step S1945 encrypts the file to be updated using the read access key. In step S1950, the Bio-cloud client signs the file by utilizing the write access private key, and generating the file to be updated to be transmitted to the Bio-cloud server.

Further, in step S1960 the Bio-cloud client creates an update file command that is signed with the write access private key. Note that the update command includes the user ID and also includes the new updated file.

In step S1965 the Bio-cloud client transmits the update file command to the Bio-cloud server where after the process ends in step S1970.

Figure 20:
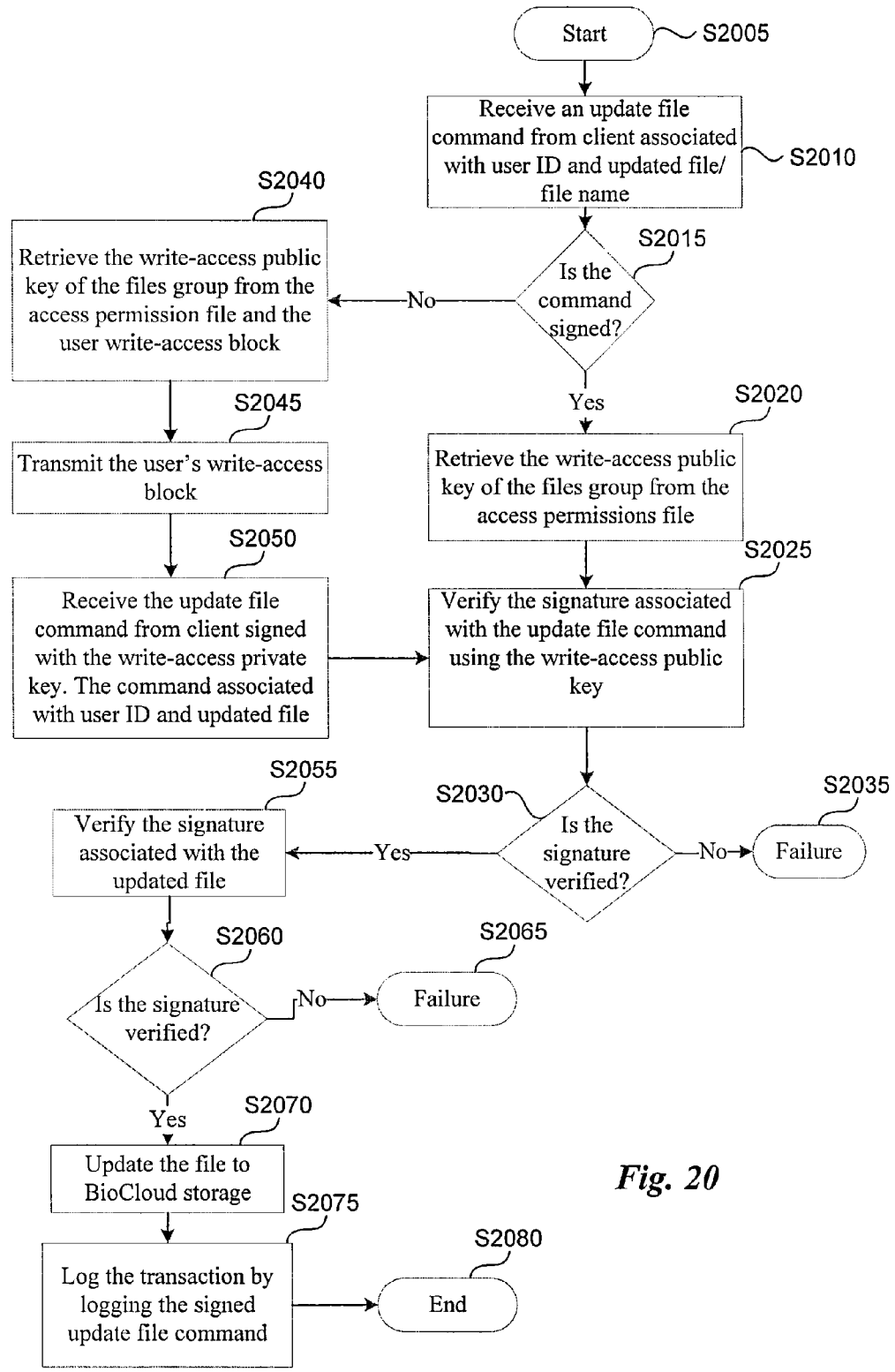
FIG. 20 illustrates a flowchart for Bio-cloud server updating a file according to one example.

FIG. 20 depicts according to an example a flowchart illustrating the steps performed by a Bio-cloud server to update a file. The process starts in step S2005 and proceeds to step S2010.

In step S2010, the Bio-cloud server receives an update file command that is transmitted by a Bio-cloud client. Note that the update file command is associated with a particular user ID and a file name that is to be updated. The process then proceeds to step S2015, wherein a query is made to determine if the command has been signed by the Bio-cloud client. If the response to the query is negative, the process proceeds to step S2040, else if the response to the query is affirmative, the process proceeds to step S2020.

In step S2040, the Bio-cloud server retrieves the write access public key of the file-group from the access permission file (in which the intended file to be updated belongs). Further, the Bio-cloud server may also extract the write access block from the access permission file.

In step S2045, the Bio-cloud server transmits the write access block to the Bio-cloud client. Further, in step S2050 the Bio-cloud server receives an updated file command from the Bio-cloud client that is signed by the write access private key. Moreover, the command is also associated with a user ID and an updated file. Thereafter, the process proceeds to step S2025.

If the response to the query in step S2015 is affirmative, then in step S2020, the Bio-cloud server retrieves the write access public key of the file-group from the access permission file. Thereafter, in step S2025 the Bio-cloud server verifies the signatures that are associated with the update file command using the write access public key (that is retrieved from step S2020).

In step S2030, a query is made to determine if the signature has been verified successfully. If the response to the query is negative, the process proceeds to step S2035 wherein the Bio-cloud server may be configured to transmit a failure message that may be displayed on a display terminal of the Bio-cloud client's device. However, if the response to the query is affirmative, the process proceeds to step S2055, wherein a secondary check is made to verify the signature associated with the updated file. Note that the signature attached to the updated file 204 is verified using the write access public key The process then proceeds to step S2060 wherein a query is made to determine whether the signature associated with the updated file is successfully verified. If the response to the query is negative, the process proceeds to step S2065 wherein, the Bio-cloud server may be configured to transmit a failure message to be displayed on a display terminal of the Bio-cloud clients' device. However, if the response to the query in step S2060 is affirmative, the process proceeds to step S2070 wherein the Bio-cloud server transmits the updated file and stores it in the Bio-cloud storage.

The process then proceeds to step S2075 wherein the Bio-cloud server may optionally log the update transaction performed by the Bio-cloud client by maintaining a log of the signed updated file command transmitted by the Bio-cloud client in a logging module. After performing the logging transaction of step S2075, the process ends in step S2080.

Figure 21:
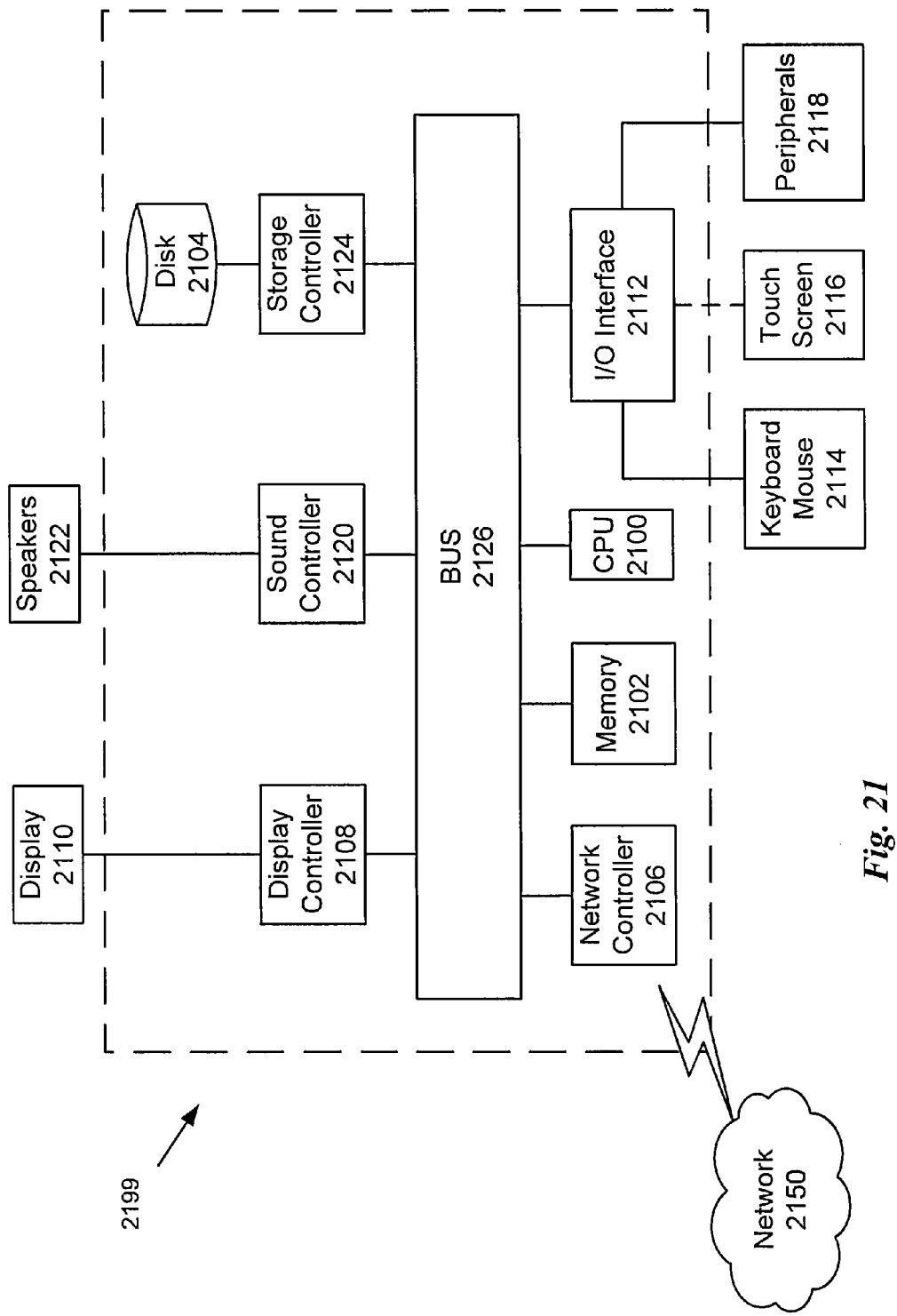
FIG. 21 illustrates a block diagram of a server according to an embodiment.

FIG. 21 illustrates a block diagram of a computing device (server) included in the bio-cloud system according to an embodiment. In FIG. 21, the server 2199 includes a CPU 2100 which performs the processes described above. The process data and instructions may be stored in memory 2102. These processes and instructions may also be stored on a storage medium disk 2104 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the system communicates, such as a server or computer.

Further, the claimed advancements may be provided as a utility application, background daemon, or component of an operating system, or combination thereof, executing in conjunction with CPU 2100 and an operating system such as Microsoft Windows 7, UNIX, Solaris, LINUX, Apple MAC-OS and other systems known to those skilled in the art.

CPU 2100 may be a Xenon or Core processor from Intel of America or an Opteron processor from AMD of America, or may be other processor types that would be recognized by one of ordinary skill in the art. Alternatively, the CPU 2100 may be implemented on an FPGA, ASIC, PLD or using discrete logic circuits, as one of ordinary skill in the art would recognize. Further, CPU 2100 may be implemented as multiple processors cooperatively working in parallel to perform the instructions of the inventive processes described above.

The server 2199 in FIG. 5 also includes a network controller 2106, such as an Intel Ethernet PRO network interface card from Intel Corporation of America, for interfacing with network 2150. As can be appreciated, the network 2150 can be a public network, such as the Internet, or a private network such as an LAN or WAN network, or any combination thereof and can also include PSTN or ISDN sub-networks. The network 2150 can also be wired, such as an Ethernet network, or can be wireless such as a cellular network including EDGE, 3G and 4G wireless cellular systems. The wireless network can also be Wi-Fi, Bluetooth, or any other wireless form of communication that is known.

The server 2199 further includes a display controller 2108, such as a NVIDIA GeForce GTX or Quadro graphics adaptor from NVIDIA Corporation of America for interfacing with display 2110, such as a Hewlett Packard HPL2445w LCD monitor. A general purpose I/O interface 2112 interfaces with a keyboard and/or mouse 2114 as well as a touch screen panel 2116 on or separate from display 2110. General purpose I/O interface also connects to a variety of peripherals 2118 including printers and scanners, such as an OfficeJet or Desk-Jet from Hewlett Packard. A sound controller 2120 may also be provided in the computer 2199, such as Sound Blaster X-Fi Titanium from Creative, to interface with speakers/microphone 2122 thereby providing sounds and/or music.

The general purpose storage controller 2124 connects the storage medium disk 2104 with communication bus 2126, which may be an ISA, EISA, VESA, PCI, or similar, for interconnecting all of the components of the robot-guided medical procedure system. A description of the general features and functionality of the display 2110, keyboard and/or mouse 2114, as well as the display controller 2108, storage controller 2124, network controller 2106, sound controller 2120, and general purpose I/O interface 2112 is omitted herein for brevity as these features are known.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

It should be noted that, as used in the specification and the appended claims, the singular forms "a," "an," and "the" include plural referents unless the context clearly dictates otherwise.

The invention claimed is:

1. A data storage system comprising:
a network;
at least one client; and
at least one server configured to
    maintain at least one access permission file having a file-group name, a plurality of client access blocks, a first public key, a second public key and a signature, each client access block including a client ID and at least one of a first access key, a second access key and a third access key,
    generate and store for each access key, a bio-token that encapsulates the access key with a biometric information of the client,
    determine if a request received from the client is signed using one of the first access key and the second access key;
    transmit to the client via the network, the client access block based on the client ID, upon determining that the received request is not signed, and
    grant one of a first level of access to the client based on a successful verification of the signed request with the first public key and a second level of access to the client based on a successful verification of the signed request with the second public key.

2. The data storage system of claim 1, wherein a first access block of the plurality of client access blocks is an access block of an owner of the access permission file, the first access block including the first access key, the second access key and the third access key.

3. The data storage system of claim 1, wherein the first public key is a manage access public key of the access permission file and the second public key is a write access public key of the access permission file.

4. The data storage system of claim 2, wherein the first access key is a manage access private key, the second access key is a write access private key and the third access key is a symmetrical read only access key.

5. The data storage system of claim 1, wherein the request received from the client further includes atleast one of the client ID, the file-group name, and a filename of a file belonging to the atleast one access permission file.

6. The data storage system of claim 1, wherein the first level of access provides the client a right to control an access level of other clients in the data storage system with respect to the corresponding access permission file.

7. The data storage system of claim 5, wherein the second level of access provides the client write access to modify contents of the file belonging to the access permission file.

8. The data storage system of claim 1, wherein the server includes a logging module that is configured to track client accesses to the data storage system.

9. The data storage system of claim 1, wherein the integrity of the entire content of the access permission file is ensured with the signature, the signature being based on a manage access private key of the access permission file.

10. The data storage system of claim 5, wherein the file is encrypted with the third access key to ensure data confidentiality and the file is signed with the second access key to ensure data integrity.

11. The data storage system of claim 1, wherein the client upon receiving the client access block, extracts atleast one of the first access key, the second access key and the third access key from a corresponding bio-token included in the access block, by submitting the clients biometric information to a biometric reader, the biometric reader being one of a fingerprint detector, a face detector, and a bio-sensor.

12. The data storage system of claim 1, wherein the server is further configured to grant a third level of access based on the client access block including only the third access key.

13. A method performed by a data storage system, the method comprising:
    maintaining on atleast one access permission file having a file-group name, a plurality of client access blocks, a first public key, a second public key and a signature, each client access block including a client ID and at least one of a first access key, a second access key and a third access key;
    generating and storing, at the atleast one server, for each access key a bio-token that encapsulates the access key with a biometric information of the client;
    determining if a request received from the client is signed using one of the first access key and the second access key;
    transmitting to the client via the network, the client access block based on the client ID, upon determining that the received request is not signed, and
    granting, by the atleast one server, one of a first level of access to the client based on a successful verification of the signed request with the first public key and a second level of access to the client based on a successful verification of the signed request with the second public key.

14. The method of claim 13, wherein a first access block of the plurality of client access blocks is an access block of an owner of the access permission file, the first access block including the first access key, the second access key and the third access key.

15. The method of claim 13, wherein the first public key is a manage access public key of the access permission file and the second public key is a write access public key of the access permission file.

16. The method of claim 13, further comprising:
maintaining, a log of the client accesses to the data storage system; and
ensuring the integrity of the content of the access permission file with the signature, the signature being based on a manage access private key of the access permission file.

17. The method of claim 13, wherein a plurality of clients communicate with the at least one server via a network, the network being one of a dedicated network and a public network.

18. A server comprising:
a memory; and
processing circuitry configured to
maintain at least one access permission file having a file-group name, a plurality of client access blocks, a first public key, a second public key and a signature, each client access block including a client ID and at least one of a first access key, a second access key and a third access key,
generate and store for each access key, a bio-token that encapsulates the access key with a biometric information of the client,
determine if a request received from the client is signed using one of the first access key and the second access key;
transmit to the client via the network, the client access block based on the client ID, upon determining that the received request is not signed, and
grant one of a first level of access to the client based on a successful verification of the signed request with the first public key and a second level of access to the client based on a successful verification of the signed request with the second public key.

19. The server of claim 18, wherein a first access block of the plurality of client access blocks is an access block of an owner of the access permission file, the first access block including the first access key, the second access key and the third access key.

20. The server of claim 18, wherein the first level of access provides the client a right to control an access level of other clients in the data storage system with respect to the corresponding access permission file and the second level of access provides the client write access to modify contents of a file belonging to the access permission file.

* * * * *